United States Patent
Matsumura et al.

(10) Patent No.: US 12,425,907 B2
(45) Date of Patent: Sep. 23, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 430 days.

(21) Appl. No.: 17/921,251

(22) PCT Filed: Apr. 30, 2020

(86) PCT No.: PCT/JP2020/018293
§ 371 (c)(1),
(2) Date: Oct. 25, 2022

(87) PCT Pub. No.: WO2021/220474
PCT Pub. Date: Nov. 4, 2021

(65) Prior Publication Data
US 2023/0189037 A1    Jun. 15, 2023

(51) Int. Cl.
*H04L 43/00* (2022.01)
*H04B 17/345* (2015.01)
*H04L 5/00* (2006.01)
*H04W 24/10* (2009.01)

(52) U.S. Cl.
CPC .......... *H04W 24/10* (2013.01); *H04B 17/345* (2015.01); *H04L 5/0035* (2013.01); *H04L 5/0051* (2013.01)

(58) Field of Classification Search
None
See application file for complete search history.

(56) References Cited

U.S. PATENT DOCUMENTS

2023/0046218 A1* 2/2023 Matsumura .......... H04B 7/0626
2023/0208490 A1* 6/2023 Kim ...................... H04L 5/0051
370/329

OTHER PUBLICATIONS

International Search Report issued in PCT/JP2020/018293 on Dec. 22, 2020 (1 page).
Written Opinion of the International Searching Authority issued in PCT/JP2020/018293 on Dec. 22, 2020 (3 pages).
(Continued)

*Primary Examiner* — Willie J Daniel, Jr.
(74) *Attorney, Agent, or Firm* — Osha Bergman Watanabe & Burton LLP

(57) ABSTRACT

A terminal according to an aspect of the present disclosure includes a receiving section that performs reception in at least one of a zero power channel state information reference signal (ZP-CSI-RS) resource and a non zero power channel state information reference signal (NZP-CSI-RS) resource configured for a plurality of transmission/reception points, and a control section that controls interference measurement for at least one of a periodic channel state information (CSI) report, a semi-persistent CSI report, and an aperiodic CSI report based on the reception. According to an aspect of the present disclosure, measurement and reporting of CSI for a multi panel/TRP can be appropriately performed.

5 Claims, 23 Drawing Sheets

(56) References Cited

OTHER PUBLICATIONS

Huawei, HiSilicon; "CSI acquisition details for NCJT"; 3GPP TSG RAN WG1 Meeting #91, R1-1719815; Reno, USA; Nov. 27-Dec. 1, 2017 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 202080102508.6, mailed Jan. 22, 2025 (10 pages).
Spreadtrum Communications: "Discussion on CSI enhancement for multiple TRP/Panel transmission"; 3GPP TSG RAN WG1 #98, R1-1908961; Prague, CZ, Aug. 26-30, 2019 (4 pages).
Office Action issued in Chinese Application No. 202080102508.6, mailed Apr. 30, 2025 (16 pages).

* cited by examiner

| Configured CSI-RS resource | Configured Interference Measurement Resources | Interference from other TRP |
|---|---|---|
| NZP CSI-RS of TRP#1 | ZP CSI-RS of TRP#1 with interference from TRP#2 | Interference from TRP #2 |
| | ZP CSI-RS of TRP#1 without interference from TRP#2 | No interference from TRP #2 |
| NZP CSI-RS of TRP#2 | ZP CSI-RS of TRP#2 with interference from TRP#1 | Interference from TRP #1 |
| | ZP CSI-RS of TRP#2 without interference from TRP#1 | No interference from TRP #1 |

FIG. 2

| Configured CSI-RS resource | Configured Interference Measurement Resources | Interference from other TRP |
|---|---|---|
| NZP CSI-RS of TRP#1 | ZP CSI-RS of TRP#1 with interference from TRP#2 | Interference from TRP #2 |
| NZP CSI-RS of TRP#2 | ZP CSI-RS of TRP#2 with interference from TRP#1 | Interference from TRP #1 |

| Configured CSI-RS resource | Configured Interference Measurement Resources | Interference from other TRP |
|---|---|---|
| NZP CSI-RS of TRP#1 | ZP CSI-RS of TRP#1 with interference from TRP#2 | Interference from TRP #2 |
| | ZP CSI-RS of TRP#1 without interference from TRP#2 | No interference from TRP #2 |

FIG. 6B

| Configured CSI-RS resource | Configured Interference Measurement Resources | Interference from other TRP |
|---|---|---|
| NZP CSI-RS of TRP#2 | ZP CSI-RS of TRP#2 with interference from TRP#1 | Interference from TRP #1 |
| | ZP CSI-RS of TRP#2 without interference from TRP#1 | No interference from TRP #1 |

FIG. 8A

| Configured CSI-RS resource | Configured Interference Measurement Resources | Interference from other TRP |
|---|---|---|
| NZP CSI-RS of TRP#1 | ZP CSI-RS of TRP#1 with interference from TRP#2 | Interference from TRP #2 |

FIG. 8B

| Configured CSI-RS resource | Configured Interference Measurement Resources | Interference from other TRP |
|---|---|---|
| NZP CSI-RS of TRP#2 | ZP CSI-RS of TRP#2 with interference from TRP#1 | Interference from TRP #1 |

```
reportQuantity-r17            CHOICE {
    none                          NULL,
    cri-RI-PMI-CQI                NULL,
    cri-RI-i1                     NULL,
    cri-RI-i1-CQI                 SEQUENCE {
        pdsch-BundleSizeForCSI        ENUMERATED {n2, n4}    OPTIONAL    -- Need S
    },
    cri-RI-CQI                    NULL,
    cri-RSRP                      NULL,
    ssb-Index-RSRP                NULL,
    cri-RI-LI-PMI-CQI             NULL
}
OPTIONAL,    -- Need R
nrofReportedRS-r17            ENUMERATED {n1, n2, n3, n4}    OPTIONAL,    -- Need S
```

FIG. 17

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

For NR, studies have been conducted about DL transmission (for example, PDSCH transmission) to a user terminal (UE (User Equipment)) performed by one or a plurality of transmission/reception points (TRPs) (multi TRP) using one or a plurality of panels.

However, previous NR specifications such as Rel. 15 do not take the multi panel/TRP into account, and thus it is not clear how to measure and report CSI in a case where the multi panel/TRP is used. The lack of appropriate measurement and reporting of CSI may cause degradation of system performance such as a decrease in throughput.

Thus, an object of the present disclosure is to provide a terminal, a radio communication method, and a base station in which CSI is appropriately measured and reported for the multi panel/TRP.

Solution to Problem

A terminal according to an aspect of the present disclosure includes a receiving section that performs reception in at least one of a zero power channel state information reference signal (ZP-CSI-RS) resource and a non zero power channel state information reference signal (NZP-CSI-RS) resource configured for a plurality of transmission/reception points, and a control section that controls interference measurement for at least one of a periodic channel state information (CSI) report, a semi-persistent CSI report, and an aperiodic CSI report based on the reception.

Advantageous Effects of Invention

According to an aspect of the present disclosure, measurement and reporting of CSI for the multi panel/TRP can be appropriately performed.

BRIEF DESCRIPTION OF DRAWINGS

FIG. 2 is a diagram to show a configuration of interference measurement resources for the CSI-RS resources in Example 2-1;

FIG. 4 is a diagram to show a configuration of interference measurement resources for CSI-RS resources in Example 2-2;

FIGS. 6A and 6B are diagrams to show a configuration of interference measurement resources for the CSI-RS resources in Example 2-3;

FIGS. 8A and 8B are diagrams to show a configuration of interference measurement resources for the CSI-RS resources in Example 2-4;

FIG. 17 is a diagram to show a configuration of RRC configuration in Aspect 5-2;

Figure 1:
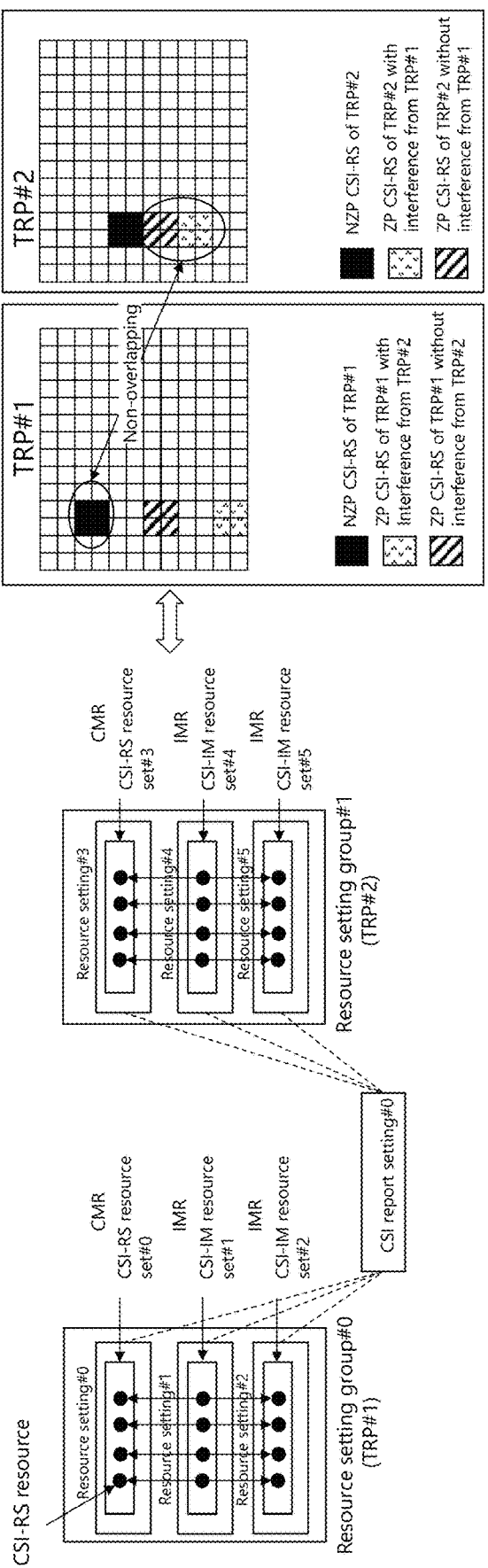
FIG. 1 is a diagram to show a configuration of CSI-RS resources in Example 2-1.

DESCRIPTION OF EMBODIMENTS (CSI Report or Reporting)

In Rel. 15 NR, a terminal (also referred to as a user terminal, (UE) User Equipment, and so on) performs generation (also referred to as determination, calculation, estimation, measurement, and so on) of channel state information based on a reference signal (RS) (or resources for the RS) and transmission (also referred to as reporting, feedback, and so on) of the CSI generated to a network (for example, a base station). The CSI may be transmitted to a base station by using, for example, an uplink control channel (for example, a PUCCH (Physical Uplink Control Channel) or an uplink shared channel (for example, a PUSCH (Physical Uplink Shared Channel)).

The RS used to generate CSI may be, for example, at least one of a channel state information reference signal (CSI-RS), a synchronization signal/physical broadcast channel (SS/PBCH) block, a synchronization signal (SS), a demodulation reference signal (DMRS), and so on.

The CSI-RS may include at least one of a non zero power (NZP) CSI-RS and CSI-IM (CSI-Interference Management). The SS/PBCH block is a block including an SS and a PBCH (and corresponding DMRS) and may be referred to as an "SS Block (SSB)" and so on.

For example, the SS may include at least one of a primary synchronization signal (PSS) and a secondary synchronization signal (SSS).

Note that the CSI may include at least one of a channel quality indicator (CQI), a precoding matrix indicator (PMI), a CSI-RS resource indicator (CRI), an SS-PBCH block resource indicator (SSBRI), a layer indicator (LI), a rank indicator (RI), L1-RSRP (layer 1 reference signal received power), L1-RSRQ (Reference Signal Received Quality), an L1-SINR (Signal to Interference plus Noise Ratio), an L1-SNR (Signal to Noise Ratio), and so on.

The UE may receive information related to CSI reporting (report configuration information) and control the CSI reporting based on the report configuration information. The report configuration information may be, for example, "CSI-ReportConfig," which is an information element (IE) of radio resource control (RRC). Note that the RRC IE as used herein may be replaced with an RRC parameter, a higher layer parameter, and so on.

The report configuration information (for example, the RRC IE "CSI-ReportConfig") may include at least one of the following.

Information related to the type of the CSI reporting (reporting type information, for example, an RRC IE "reportConfigType")

Information related to one or more quantities of CSI to be reported (one or more CSI parameters) (report quantity information, for example, an RRC IE "reportQuantity")

Information related to RS resources used to generate the quantity (the CSI parameter) (resource information, for example, an RRC IE "CSI-ResourceConfigId")

Information related to a frequency domain intended for the CSI reporting (frequency domain information, for example, an RRC IE "reportFreqConfiguration")

For example, the report type information may indicate periodic CSI (P-CSI) reporting, aperiodic CSI (A-CSI) reporting, or semi-persistent CSI reporting.

The report quantity information may specify at least one combination of the CSI parameters described above (for example, CRI, RI, PMI, CQI, LI, L1-RSRP, and so on).

The resource information may be an ID of an RS resource. The RS resource may include, for example, a non zero power CSI-RS resource or SSB and a CSI-IM resource (for example, a zero power CSI-RS resource).

The frequency domain information may indicate the frequency granularity of the CSI reporting. The frequency granularity may include, for example, a wide band and a sub band. The wide band is the entire CSI reporting band. The wide band may be, for example, an entire certain carrier (component carrier (CC), a cell, a serving cell) or may be a bandwidth part (BWP) within the certain carrier. The wide band may be replaced with a CSI reporting band, the entire CSI reporting band, and so on.

The subband is a part of the wide band and may include one or more resource blocks (RBs) or physical resource blocks (PRBs). The size of the subband may be determined according to the size of the BWP (the number of PRBs).

The frequency domain information may indicate which PMI of the wide band or the subband is to be reported (the frequency domain information may include, for example, an RRC IE "pmi-FormatIndicator" used to determine wide band PMI reporting or subband PMI reporting). The UE may determine the frequency granularity of the CSI reporting (that is, the wide band PMI report or the subband PMI report) based on at least one of the report quantity information and the frequency domain information.

In a case where the wide band PMI reporting is configured (determined), one wide band PMI may be reported for the entire CSI reporting band. On the other hand, in a case where the subband PMI reporting is configured, single wideband indication $i_1$ may be reported for the entire CSI reporting band, and one subband indication $i_2$ of each of one or more subbands within the entire CSI reporting band (for example, the subband indication of each subband).

The UE uses an RS received to perform channel estimation to estimate a channel matrix H. The UE feeds back an index (PMI) determined based on the channel matrix estimated.

The PMI may indicate a precoder matrix (also simply referred to as a precoder) considered by the UE to be appropriate to be used for downlink (DL) transmission to the UE. Each value of the PMI may correspond to one precoder matrix. A set of values of the PMI may correspond to a set of different precoder matrices referred to as precoder codebooks (or simply referred to as codebooks).

In a space domain, the CSI reporting may include one or more types of CSI. For example, the CSI may include at least one of a first type used to select a single beam (type 1 CSI) and a second type used to select a multi beam (type 2 CSI). The single beam may be replaced with a single layer, and the multi beam may be replaced with a plurality of beams. The type 1 CSI does not assume multi user multiple input multiple output (MIMO), and the type 2CSI may assume the multi user MIMO.

The codebook described above may include a codebook for type 1 CSI (also referred to as a type 1 codebook and so on) and a codebook for type 2 CSI (also referred to as a type 2 codebook and so on). The type 1 CSI may include type 1 single panel CSI and type 1 multi panel CSI for which different codebooks (type 1 single panel codebook and type 1 multi panel codebook) may be specified.

Type 1 and type I as used herein may be replaced with each other. Type 2 and type II as used herein may be replaced with each other.

An uplink control information (UCI) type may include at least one of Hybrid Automatic Repeat reQuest ACKnowledgement (HARQ-ACK), a scheduling request (SR), and CSI. The UCI may be carried by the PUCCH or the PUSCH.

In Rel. 15 NR, the UCI can include one CSI part for wide band PMI feedback. CSI reporting #n includes PMI wide band information in a case where the PMI wide band information is reported.

In Rel. 15 NR, the UCI can include two CSI parts for subband PMI feedback. CSI part 1 includes wide band PMI information. CSI part 2 includes one piece of wide band PMI information and a number of pieces of subband PMI information. CSI part 1 and CSI part 2 are separately coded.

In Rel. 15 NR, the UE is configured, by a higher layer, with reporting settings for N (N≥1) CSI report configurations and resource settings for M (M≥1) CSI resource configurations. For example, the CSI report configuration (CSI-ReportConfig) includes a resource setting for channel measurement (resourcesForChannelMeasurement), a CSI-IM resource setting for interference (csi-IM-ResourceForInterference), an NZP-CSI-RS setting for interference (nzp-CSI-RS-ResourceForInterference), a report quantity (reportQuantity), and so on. Each of the resource setting for channel measurement, the CSI-IM resource setting for interference, and the NZP-CSI-RS setting for interference are each associated with a CSI resource configuration (CSI-ResourceConfig, CSI-ResourceConfigId). The CSI resource configurations include a list of CSI-RS resource sets (csi-RS-ResourceSetList, for example, NZP-CSI-RS resource sets or CSI-IM resource sets).

For both FR1 and FR2, to enable more dynamic hypothesizing of channel/interference for NCJT, studies have been conducted about evaluation and specification of CSI reporting for transmission of at least one of DL multi TRP and multi panel.

(Multi TRP)

For NR, studies have been conducted about DL transmission to the UE performed by one or a plurality of transmission/reception points (TRPs) (multi TRP (MTRP)) using one or a plurality of panels (multi panel). Studies have also been conducted about UL transmission to one or a plurality of TRPs performed by the UE by using one or a plurality of panels.

Note that the plurality of TRPs may correspond to the same cell identifier (ID) or different cell IDs. The cell ID may be a physical cell ID or a virtual cell ID.

Connections for multi TRP (TRP #1, #2) may be established by ideal/non-ideal backhaul for exchange of information, data, and so on. The TRPs of the multi TRP may transmit different code words (CWs) and different layers. As a form of multi TRP transmission, non-coherent joint transmission (NCJT) may be used.

In the NCJT, for example, TRP 1 modulates and maps a first code word and layer-maps the first code word to a first number of layers (for example, two layers) and transmits a first PDSCH using first precoding. TRP 2 modulates and maps a second code word and layer-maps the second code word to a second number of layers (for example, two layers) and transmits a second PDSCH using second precoding.

Note that a plurality of PDSCHs (multi PDSCH) subjected to the NCJT may be defined to overlap partially or completely in terms of at least one of a time domain and a frequency domain. In other words, a first PDSCH from a first TRP and a second PDSCH from a second TRP may overlap in terms of at least one of the time and frequency resources.

The first PDSCH and the second PDSCH may be assumed not to be QCLed. Reception of the multi PDSCH may be replaced with simultaneous reception of a PDSCH that is not of a certain QCL type (for example, a QCL type D).

A plurality of PDSCHs (which may be referred to as a multi PDSCH (multiple PDSCHs)) may be scheduled by using one piece of DCI (single piece of DCI (S-DCI), single PDCCH) (single master mode). One piece of DCI may be transmitted from one TRP of the multi TRP. A plurality of PDSCHs from the multi TRP may each be scheduled by using a plurality of pieces of DCI (multi DCI (M-DCI), multi PDCCH (multiple PDCCHs)) (multi master mode). A plurality of pieces of DCI may be transmitted from the respective TRPs of the multi TRP. The UE may be assumed to transmit, to different TRPs, separate CSI reportings (CSI reports) related to the respective TRPs. Such CSI feedback may be referred to as separate feedback, separate CSI feedback, and so on. "Separate" as used herein may be replaced with "independent."

Note that CSI feedback may be utilized in which a CSI report related to both TRPs is transmitted to one TRP. Such CSI feedback may be referred to as joint feedback, joint CSI feedback, and so on.

For example, in the separate feedback, the UE is configured to transmit a CSI report for TRP #1 to TRP #1 by using a certain PUCCH (PUCCH 1) and to transmit a CSI report for TRP #2 to TRP #2 by using another PUCCH (PUCCH 2). In the joint feedback, the UE is configured to transmit a CSI report for TRP #1 to TRP #1 by using a certain PUCCH (PUCCH 1) and to transmit a CSI report for TRP #2 to TRP #2 by using another PUCCH (PUCCH 2).

Such a multi TRP scenario enables flexible transmission control using a high-quality channel.

In the multi TRP transmission, the CSI normally varies among a plurality of different TRPs, and thus it is not clear how to measure and report CSI for a plurality of different TRPs. For one TRP, the assumption of channels/interference varies depending on determination of transmission to peripheral TRPs (traffic).

For example, a CSI report for separate feedback (which may be referred to as a separate CSI report) may be configured by using one CSI report configuration (CSI-ReportConfig) associated with one TRP.

The CSI report configuration may correspond to one assumption of interference for one TRP (in other words, a different CSI report configuration may be used for each TRP and for each interference assumption). The CSI report configuration may correspond to a plurality of assumptions of interference for one TRP (in other words, a different CSI report configuration may be used for each TRP and one CSI report configuration may be associated with a plurality of assumptions of interferences for a certain TRP.

For example, a CSI report for joint feedback (which may be referred to as a joint CSI report) may be configured by using one CSI report configuration (CSI-ReportConfig) associated a plurality of TRPs.

The CSI report configuration may correspond to one assumption of interference for each of a plurality of TRPs (in other words, certain CSI reporting configuration may be used to configure CSI reporting including CSI with interference assumption #1 for TRP #1 and CSI with interference assumption #1 for TRP #2, and another CSI report configuration may be used to configure CSI reporting including CSI with interference assumption #2 for TRP #1 and CSI with interference assumption #1 for TRP #2). The CSI report configuration may correspond to a plurality of assumptions of interference for a plurality of TRPs (in other words, one CSI report configuration may be used to configure CSI reporting including two pieces of CSI with interference assumptions #1, #2 for TRP #1 and two pieces of CSI with interference assumptions #3, #4 for TRP #2).

Note that the CSI report configuration for the joint CSI report may include a resource configuration for each TRP (at least one of the resource setting for channel measurement, CSI-IM resource setting for interference, and NZP-CSI-RS setting for interference). The resource configuration for a certain TRP may be included in a resource setting group for configuration.

Note that the resource setting group may be identified by a configured resource setting group index. The resource setting group may be replaced with a report group. The resource setting group index (which may also be simply referred to as a group index) may represent the CSI report associated with the TRP (to which TRP certain CSI report (or a CSI report configuration, a CSI resource configuration, a CSI-RS resource set, a CSI-RS resource, a TCI state, QCL, and so on corresponds). For example, group index #i may correspond to TRP #i.

The CSI report configuration for the separate CSI report may be referred to as a separate CSI report configuration, a separate CSI configuration, and so on. The CSI report configuration for the joint CSI report may be referred to as a joint CSI report configuration, a joint CSI configuration, and so on.

For the MTRP, the single TRP (STRP) and the MTRP transmission are dynamically switched depending on the channel state or the like. For this purpose, CSI as described below is required:

CSI for TRP 1 (first TRP) for which STRP transmission is assumed (hereinafter also referred to as CSI_A),
CSI for TRP 2 (second TRP) for which STRP transmission is assumed (hereinafter also referred to as CSI_B),
CSI for TRP 1 for which TRP/beam interference from TRP 2 is taken into account and for which the NCJT transmission for the MTRP is assumed (hereinafter also referred to as CSI_C), and
CSI for TRP 2 for which TRP/beam interference from TRP 1 is taken into account and for which the NCJT transmission for the MTRP is assumed (hereinafter also referred to as CSI_D).

<Aperiodic CSI>

For the aperiodic CSI, each trigger state configured by using a higher layer parameter "CSI-AperiodicTriggerState" is associated with one or a plurality of CSI report configurations (CSI-ReportConfig). Each CSI report configuration is linked with a periodic resource setting, a semi-persistent resource setting, or an aperiodic resource setting.

In a case where one resource configuration is provided, the resource configuration (provided by a higher layer parameter resourcesForChannelMeasurement) is intended for channel measurement for L1-RSRP or L1-SINR calculation.

In a case where two resource configurations are provided, the first resource configuration (provided by a higher layer parameter resourcesForChannelMeasurement) is intended for channel measurement, and the second resource configuration (provided by a higher layer parameter csi-IM-ResourcesForInterference or nzp-CSI-RS-ResourcesForInterference) is intended for interference measurement performed by the CSI-IM or NZP-CSI-RS.

In a case where three resource configurations are provided, the first resource configuration (provided by a higher layer parameter resourcesForChannelMeasurement) is intended for channel measurement, the second resource configuration (provided by a higher layer parameter csi-IM-ResourcesForInterference) is intended for CSI-IM-based interference measurement, and the third resource configuration (provided by a higher layer parameter nzp-CSI-RS-ResourcesForInterference) is intended for NZP-CSI-RS-based interference measurement.

In a case where aperiodic CSI is applied, NR may support interference measurement based on only the ZP-CSI-RS, only the NZP-CSI-RS, and the ZP-CSI-RS and the NZP-CSI-RS.

<Semi-Persistent or Periodic CSI>

In a case where semi-persistent or periodic CSI is applied, each CSI report configuration (CSI-ReportConfig) is linked with the periodic or semi-persistent resource setting.

In a case where one resource configuration (provided by the higher layer parameter resourcesForChannelMeasurement) is provided, the resource configuration is intended for channel measurement for L1-RSRP calculation.

In a case where two resource configurations are provided, the first resource configuration (provided by the higher layer parameter resourcesForChannelMeasurement) is intended for channel measurement, and the second resource configuration (provided by the higher layer parameter csi-IM-ResourcesForInterference) is intended for interference measurement performed by the CSI-IM.

In a case where aperiodic CSI is applied, NR may exclusively support the interference measurement based on the ZP-CSI-RS.

<CSI-IM Resource and CSI-RS Resource>

The CSI-IM resource for interference measurement, the NZP-CSI-RS resource for interference measurement, and the NZP-CSI-RS resource for channel measurement are configured by higher layer signaling for one or more CSI resource configurations for channel and interference measurement.

The UE may assume that the NZP-CSI-RS resource for interference measurement and the CSI-IM resource for interference measurement configured for one CSI report are QCLed for each resource with respect to the "QCL-TypeD." In a case where the NZP-CSI-RS resource is used for interference measurement, the UE may assume the NZP-CSI-RS resource for channel measurement and the CSI-IM resource or the NZP-CSI-RS resource for interference measurement configured for one CSI report. The CSI report is QCLed with respect to the "QCL-TypeD."

In a case where ZP-CSI-RS-based interference measurement is applied, the UE may assume that the same reception beam as that indicated by the base station (gNB) for channel measurement is used for interference measurement.

In a case where interference measurement is performed by the CSI-IM, each CSI-RS resource for channel measurement is associated with the CSI-IM resource in resource units in accordance with ordering of CSI-RS resources and CSI-IM resources within a corresponding resource set. The number of CSI-RS resources for channel measurement may be the same as the number of CSI-IM resources.

For the ZP-CSI-RS-based interference measurement, CSI-RS resources for channel measurement and CSI-RS interference measurement resources are associated with one another on a resource-by-resource basis. In other words, this corresponds to one-by-one mapping.

<UE Operation Related to Interference Measurement>

In a case where CSI measurement other than L1-SINR is applied, the UE may assume at least one of (1) to (3) described below.

(1) Each NZP-CSI-RS port configured for interference measurement corresponds to an interference transmission layer.
(2) For all interference transmission layers on the NZP-CSI-RS port for interference measurement, an associated EPRE (Energy Per Resource Element) ratio is taken into account.

(3) Another interference signal on an RE (Resource Element) for the NZP-CSI-RS for channel measurement, the NZP-CSI-RS for interference measurement, or the CSI-IM for interference measurement.

In a case where the L1-SINR measurement using a dedicated interference measurement resource is applied, the UE assumes that the total received power of the dedicated NZP-CSI-RS resource for interference measurement or dedicated CSI-IM resource for interference measurement corresponds to interference and noise.

<Joint CSI Report>

[Assumption 1] One CSI report configuration (CSI-ReportConfig) corresponds to a plurality of TRPs with a plurality of interference assumptions. In this case, one CSI report reports a plurality of pieces of CSI.

[Assumption 2] One CSI report configuration corresponds to a plurality of TRPs with one interference assumption. In this case, one CSI report reports a plurality of pieces of CSI.

<Separate CSI Report>

[Assumption 3] One CSI report configuration corresponds to one TRP with a plurality of interference assumptions #1. In this case, one CSI report reports a plurality of pieces of CSI.

[Assumption 4] One CSI report configuration corresponds to a TRPs with one interference assumption #1. In this case, one CSI report reports one piece of CSI.

Although the joint CSI report and the separate CSI report have been under study as described above, how to measure and report CSI is not clear. Specifically, there are problems as described below.

[Problem 1] Which resource can be configured for interference measurement of the NCJT is unknown.

[Problem 2] Whether the NZP-CSI-RS resource for channel measurement and the ZP-CSI-RS resource for interference measurement can overlap is unknown.

[Problem 3] The assumptions and operations of the UE related to interference measurement are unknown.

[Problem 4] What is used for a reception beam of the UE for the ZP-CSI-RS resource for interference measurement is unknown.

[Problem 5] A method for determining the number of pieces of CSI to be reported is unknown, and a method for selecting from CMRs/IMRs for CSI report is unknown.

The lack of appropriate measurement and reporting of CSI may cause degradation of system performance such as a decrease in throughput. Thus, the inventors of the present invention came up with a method for appropriately measuring and reporting CSI for the multi panel/TRP.

Embodiments according to the present invention will be described in detail with reference to the drawings as follows. The radio communication method according to each embodiment may be employed independently or may be employed in combination.

As used herein, "A/B" and "at least one of A and B" may be replaced with each other.

As used herein, the following may be replaced with one another: a panel, an uplink (UL) transmission entity, a TRP, a spatial relation, a control resource set (CORESET), the PDSCH, a code word, a base station, an antenna port for a certain signal (for example, a demodulation reference signal (DMRS) port), an antenna port group for a certain signal (for example, a DMRS port group), a group for multiplexing (for example, code division multiplexing (CDM) group, a reference signal group, a CORESET group), a CORESET pool, a CW, a redundancy version (RV), and a layer (an MIMO layer, a transmission layer, a space layer). A panel identifier (ID) and a panel may be replaced with each other. A TRP ID and a TRP as used herein may be replaced with each other.

As used herein, NCJT, NCJT using the multi TRP, a multi PDSCH using the NCJT, a multi PDSCH, a plurality of PDSCHs from the multi TRP, and so on may be replaced with one another. Note that the multi PDSCH may mean a plurality of PDSCHs with at least some of time resources (for example, one symbol) overlapping, a plurality of PDSCHs with all of the time resources (for example, all symbols) overlapping, a plurality of PDSCHs with none of the time resources overlapping, a plurality of PDSCHs carrying the same TB or the same CW, or a plurality of PDSCHs to which different UE beams (space domain reception filters, QCL parameters) are applied.

A cell, a CC, a carrier, a BWP, and a band as used herein may be replaced with one another.

An index, an ID, an indicator, a resource ID, and so on as used herein may be replaced with one another. As used herein, the following may be replaced with one another: a beam, a TCI, a TCI state, a DL TCI state, a UL TCI state, a unified TCI state, QCL, a QCL assumption, a spatial relation, spatial relation information, a precoder, and so on.

As used herein, a list, a group, a set, a subset, a cluster, and so on may be replaced with each other.

As used herein, the following may be replaced with one another: a TRP index, a CORESET pool index (CORESET-PoolIndex), a pool index, a group index, a CSI reporting setting group index, a CSI reporting group index, a CSI report configuration index, a CSI reporting setting group index, and a resource setting group index.

As used herein, a channel measurement resource setting, a channel measurement resource, resourcesForChannelMeasurement may be replaced with one another. As used herein, the following may be replaced with one another: a CSI-IM resource setting for interference, a CSI-IM based resource for interference measurement, a csi-IM-ResourceForInterference, and a resource for interference measurement. As used herein, the following may be replaced with one another: an NZP-CSI-RS resource setting for interference, an NZP-CSI-RS based resource for interference measurement, nzp-CSI-RS-ResourcesForInterference, and a resource for interference.

As used herein, a CSI report, a CSI report configuration, a CSI configuration, a resource setting, and so on may be replaced with each other. As used herein, "support," "control," "can control," "operate," "can operate," "execute," "can execute," and so on may be replaced with one another.

(Radio Communication Method)

First Embodiment

The UE performs reception in at least one of the ZP-CSI-RS resource and the NZP-CSI-RS resource that are configured for a plurality of transmission/reception points (multi TRP). The UE may control (support) interference measurement (IM) for at least one of the periodic CSI report, the semi-persistent CSI report, and the aperiodic CSI report that are based on the reception. In the first embodiment, as multi TRP transmission, the NCJT may be used, the multi PDSCH may be configured, or the S-DCI or M-DCI may be configured.

"S-DCI is configured" as used herein may be replaced with "S-DCI based M-TRP transmission may be configured or indicated or used." "M-DCI is configured" as used herein may be replaced with "M-DCI based M-TRP transmission may be configured or indicated or used." "M-TRP is configured" as used herein may be replaced with "M-TRP transmission may be configured or indicated or used."

In Options 1-1 to 1-3, The UE controls (supports) interference measurement (IM) for at least one of the periodic/semi-persistent CSI report and the aperiodic CSI report that is based only on the ZP-CSI-RS.

[Option 1-1] The UE supports the interference measurement for the periodic/semi-persistent CSI report based only on the ZP-CSI-RS and does not support the interference measurement for the aperiodic CSI report based only on the ZP-CSI-RS.

[Option 1-2] The UE supports the interference measurement for the aperiodic CSI report based only on the ZP-CSI-RS and does not support the interference measurement for the periodic/semi-persistent CSI report based only on the ZP-CSI-RS.

[Option 1-3] The UE supports the interference measurement for the periodic/semi-persistent CSI report based only on the ZP-CSI-RS and does not support the interference measurement for the aperiodic CSI report based only on the ZP-CSI-RS.

In Options 2-1 to 2-3, The UE controls (supports) interference measurement (IM) for at least one of the periodic/semi-persistent CSI report and the aperiodic CSI report that is based only on the NZP-CSI-RS.

[Option 2-1] The UE supports the interference measurement for the periodic/semi-persistent CSI report based only on the NZP-CSI-RS and does not support the interference measurement for the aperiodic CSI report based only on the NZP-CSI-RS.

[Option 2-2] The UE supports the interference measurement for the aperiodic CSI report based only on the NZP-CSI-RS and does not support the interference measurement for the periodic/semi-persistent CSI report based only on the NZP-CSI-RS.

[Option 2-3] The UE supports the interference measurement for both the periodic/semi-persistent CSI report and the aperiodic CSI report based only on the NZP-CSI-RS.

In Options 3-1 to 3-3, The UE controls (supports) interference measurement (IM) for at least one of the periodic/semi-persistent CSI report and the aperiodic CSI report that is based on both the ZP-CSI-RS and the NZP-CSI-RS.

[Option 3-1] The UE supports the interference measurement for the periodic/semi-persistent CSI report based on the ZP-CSI-RS and the NZP-CSI-RS and does not support the interference measurement for the aperiodic CSI report based on the ZP-CSI-RS and the NZP-CSI-RS.

[Option 3-2] The UE supports the interference measurement for the aperiodic CSI report based on the ZP-CSI-RS and the NZP-CSI-RS and does not support the interference measurement for the periodic/semi-persistent CSI report based on the ZP-CSI-RS and the NZP-CSI-RS.

[Option 3-3] The UE supports the interference measurement for both the periodic/semi-persistent CSI report and the aperiodic CSI report based on the ZP-CSI-RS and the NZP-CSI-RS.

According to the first embodiment, which resource can be configured for the interference measurement (for the multi TRP) for the NCJT is clarified, allowing Problem 1 described above to be solved. Note that in the embodiments described below, one of Options 1-1 to 1-3 may be assumed.

Second Embodiment

In a case where CSI feedback is derived (in a case where a CSI report is transmitted), the UE assumes that the NZP-CSI-RS resource for channel measurement and the ZP-CSI-RS resource for interference measurement are configured not to overlap (UE does not assume that the NZP-CSI-RS resource for channel measurement and the ZP-CSI-RS resource for interference measurement are configured to overlap). The UE may assume that the NZP-CSI-RS resource for channel measurement for one of a plurality of TRPs and the ZP-CSI-RS resource for interference measurement for another transmission/reception point of the plurality of TRPs are configured not to overlap. The resource may be replaced with a time and frequency resource, a time resource, or a frequency resource. Aspect 2-1 described below is applied to the joint CSI report, and Aspect 2-2 described below is applied to the separate CSI report.

Aspect 2-1

The UE may assume that, in the same resource setting group, the NZP-CSI-RS resource for channel measurement and the ZP-CSI-RS resource for interference measurement are configured not to overlap. The "same resource setting group" may be replaced with "resource settings associated with the same TRP."

The UE may assume that, over different resource setting groups, the NZP-CSI-RS resource for channel measurement and the ZP-CSI-RS resource for interference measurement are configured not to overlap. The "different resource setting groups" may be replaced with "resource settings associated with different TRPs."

Aspect 2-2

The UE may assume that, in resource settings associated with the same CSI reporting setting, the NZP-CSI-RS resource for channel measurement and the ZP-CSI-RS resource for interference measurement are configured not to overlap. The "resource settings associated with same CSI report setting" may be replaced with "resource settings associated with the same TRP."

The UE may assume that, over different CSI report settings, the NZP-CSI-RS resource for channel measurement and the ZP-CSI-RS resource for interference measurement are configured not to overlap. The "resource settings associated with different CSI report settings" may be replaced with "resource settings associated with different TRPs."

As examples of the second embodiment, Examples 2-1 to 2-4 will be described below. Examples 2-1 to 2-4 respectively correspond to Assumptions 1 to 4 described above. Aspect 2-1 may be applied to Examples 2-1 and 2-2. Aspect 2-2 may be applied to Examples 2-3 and 2-4.

Example 2-1

FIG. 1 is a diagram to show a configuration of CSI-RS resources in Example 2-1. FIG. 2 is a diagram to show a configuration of interference measurement resources for the CSI-RS resources in Example 2-1. In FIG. 1, resource setting group #0 is associated with TRP #1, and resource setting group #1 is associated with TRP #2. Resource setting group #0 (TRP #1) includes resource settings #0, #1, #2. Resource setting group #1 (TRP #2) includes resource settings #3, #4, #5. The resource settings are CSI report setting #0.

The resources in FIG. 1 include channel measurement resources (CMRs) and interference measurement resources (IMRs). CMR (CSI-RS resource set #0) is associated with resource setting #0. IMR (CSI-IM resource set #1) is associated with resource setting #1. IMR (CSI-IM resource set #2) is associated with resource setting #2. CMR (CSI-RS resource set #3) is associated with resource setting #3. IMR (CSI-IM resource set #4) is associated with resource setting #4. IMR (CSI-IM resource set #5) is associated with resource setting #5. As shown in Example 2-1, the CMRs and IMRs are mapped to the corresponding resources on a one-by-one basis.

In Example 2-1, the NZP-CSI-RS resource (CMR) and the ZP-CSI-RS resource (IMR) in the same TRP (resource setting group) do not overlap. The NZP-CSI-RS resource (CMR) in TRP #1 and the ZP-CSI-RS resource (IMR) in TRP #2 do not overlap. In other words, the CMRs and the IMRs corresponding to different TRPs (resource setting groups) do not overlap. Note that the ZP-CSI-RSs in TRP #1 include RSs subjected to interference from TRP #2 and RSs not subjected to interference from TRP #2. Note that the ZP-CSI-RSs in TRP #2 include RSs subjected to interference from TRP #1 and RSs not subjected to interference from TRP #2.

Example 2-2

Figure 3:
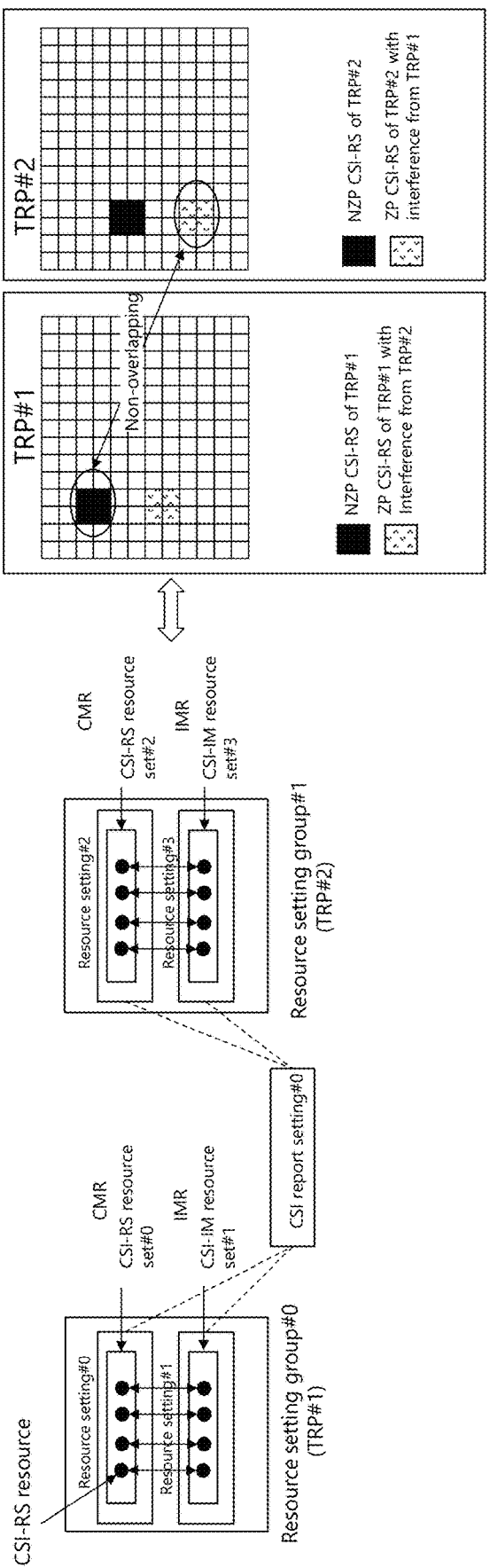
FIG. 3 is a diagram to show a configuration of CSI-RS resources in Example 2-2.

FIG. 3 is a diagram to show a configuration of CSI-RS resources in Example 2-2. FIG. 4 is a diagram to show a configuration of interference measurement resources for the CSI-RS resources in Example 2-2. Example 2-2 differs from Example 2-1 in that one resource setting associated with the IMR is included in each of resource setting groups #0, #1 (TRP #1, #2). Example 2-2 differs from Example 2-1 in that the resources in TRP #1 include no "ZP CSI-RS of TRP #1 without interference from TRP #2" and that the resources in TRP #2 include no "ZP CSI-RS of TRP #1 without interference from TRP #1."

In Example 2-2, the NZP-CSI-RS resource (CMR) and the ZP-CSI-RS resource (IMR) in the same TRP (resource setting group) do not overlap. The NZP-CSI-RS resource (CMR) in TRP #1 and the ZP-CSI-RS resource (IMR) in TRP #2 do not overlap (in different resource setting groups). In other words, the CMRs and the IMRs corresponding to different TRPs (resource setting groups) do not overlap. In Example 2-2, a CSI report involving inter-TRP interference may be applied.

Example 2-3

Figure 5:
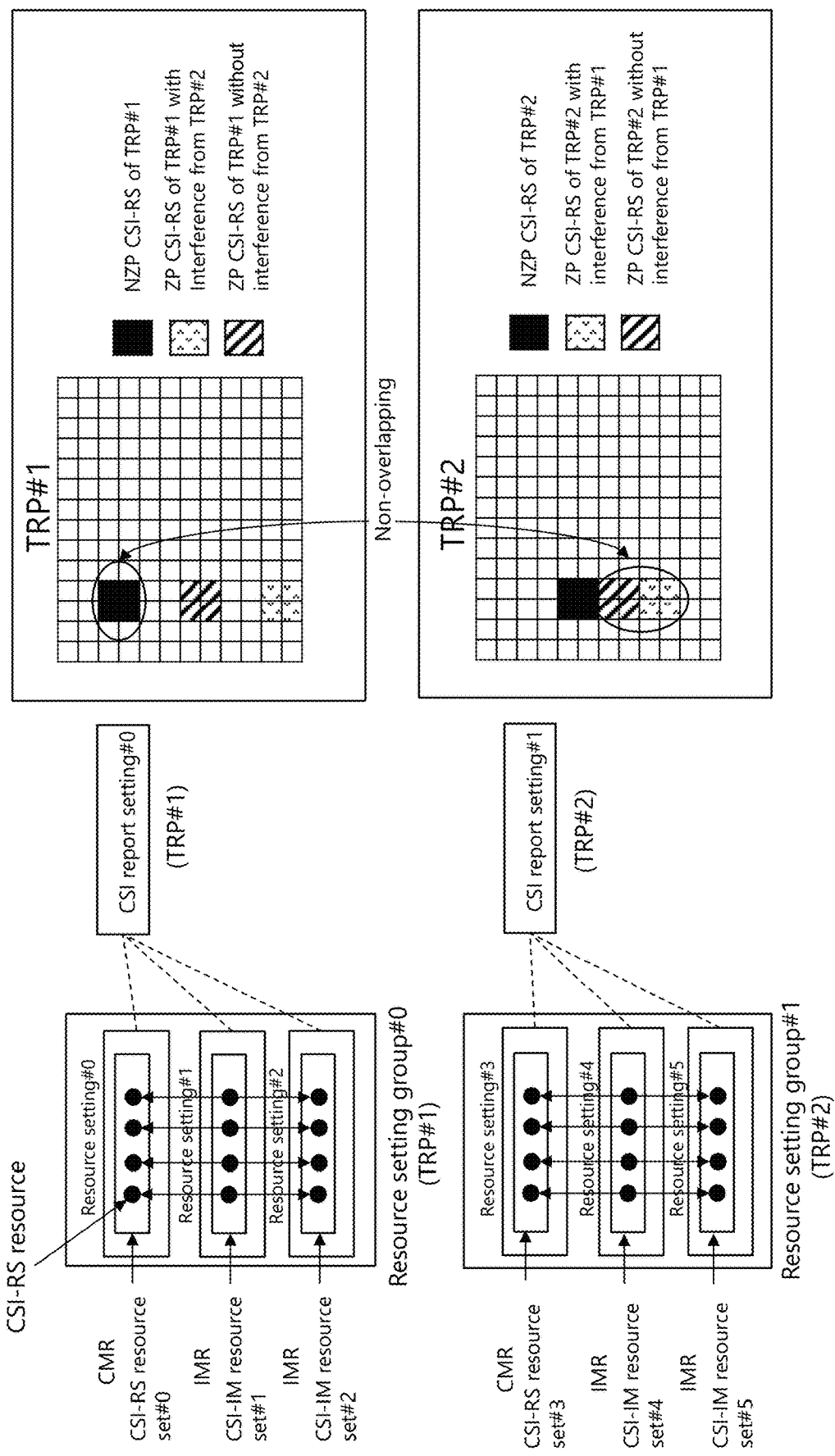
FIG. 5 is a diagram to show a configuration of CSI-RS resources in Example 2-3.

FIG. 5 is a diagram to show a configuration of CSI-RS resources in Example 2-3. FIG. 6 is a diagram to show a configuration of interference measurement resources for the CSI-RS resources in Example 2-3. Example 2-3 differs from Example 2-1 in that the CSI report setting in TRP #1 differs from the CSI report setting in TRP #2. Resource setting group #0 in TRP #1 is associated with CSI report setting #0 in TRP #1, and resource setting group #1 in TRP #2 is associated with CSI report setting #1 in TRP #2.

FIG. 6A is a diagram to show a configuration of interference measurement resources for the CSI-RS resources in TRP #1 (CSI report setting #0) in Example 2-3. FIG. 6B is a diagram to show a configuration of interference measurement resources for the CSI-RS resources in TRP #2 (CSI report setting #1) in Example 2-3. Specifically, in Example 2-3, two CSI report settings are respectively associated with two resource setting groups, and thus configurations are shown that respectively correspond to the two CSI report settings.

In Example 2-3, the NZP-CSI-RS resource (CMR) and the ZP-CSI-RS resource (IMR) in the same TRP (resource setting group) do not overlap. The NZP-CSI-RS resource (CMR) in TRP #1 and the ZP-CSI-RS resource (IMR) in TRP #2 do not overlap. In other words, the CMRs and the IMRs corresponding to different TRPs (CSI report settings) do not overlap.

Example 2-4

Figure 7:
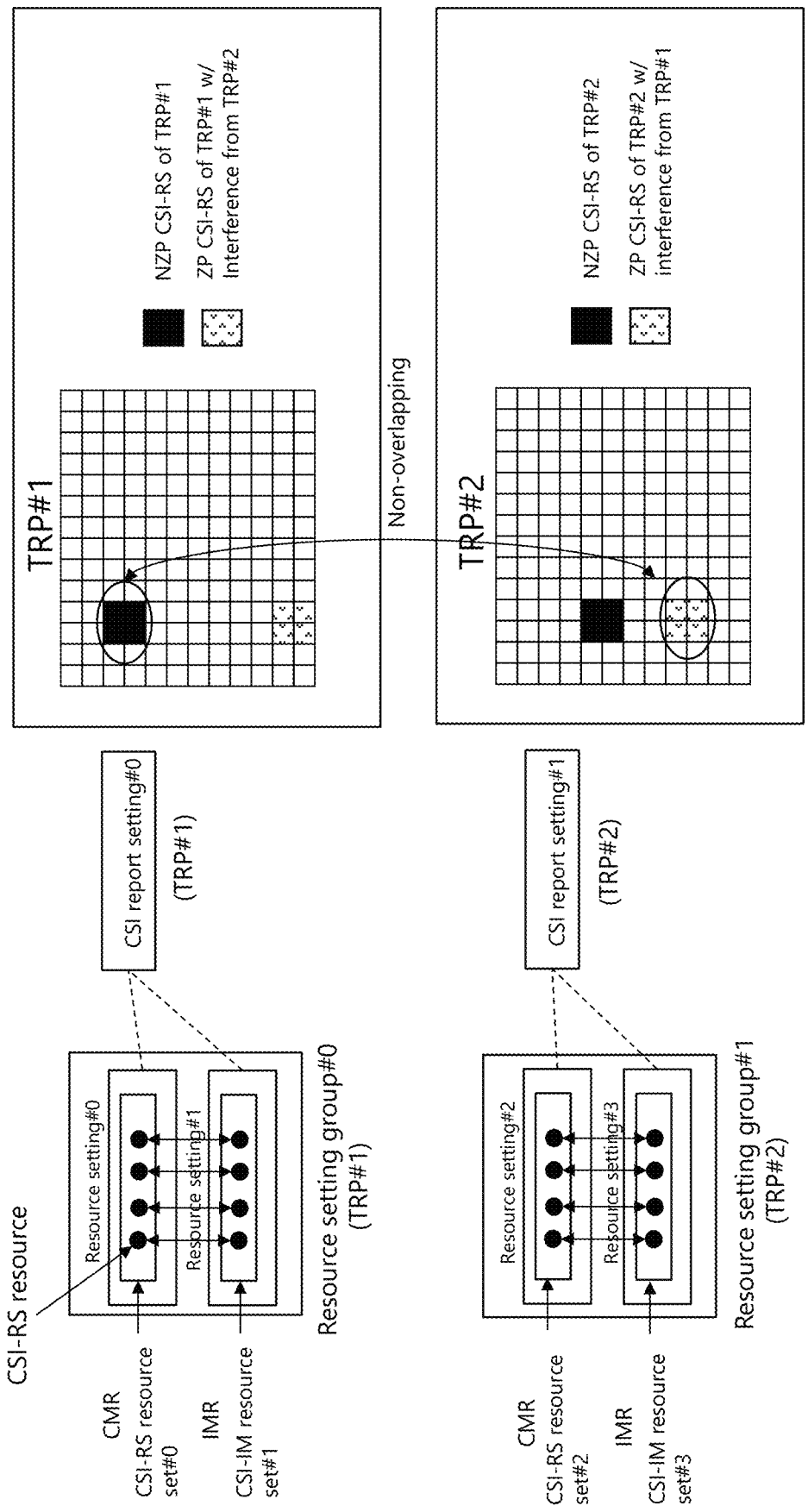
FIG. 7 is a diagram to show a configuration of CSI-RS resources in Example 2-4.

FIG. 7 is a diagram to show a configuration of CSI-RS resources in Example 2-4. FIG. 8 is a diagram to show a configuration of interference measurement resources for the CSI-RS resources in Example 2-4. Example 2-4 differs from Example 2-2 in that the CSI report setting in TRP #1 differs from the CSI report setting in TRP #2. Resource setting group #0 in TRP #1 is associated with CSI report setting #0 in TRP #1, and resource setting group #1 in TRP #2 is associated with CSI report setting #1 in TRP #2.

FIG. 8A is a diagram to show a configuration of interference measurement resources for the CSI-RS resources in TRP #1 (CSI report setting #0) in Example 2-4. FIG. 8B is a diagram to show a configuration of interference measurement resources for the CSI-RS resources in TRP #2 (CSI report setting #1) in Example 2-4. Specifically, in Example 2-4, two CSI report settings are respectively associated with two resource setting groups, and thus configurations are shown that respectively correspond to the two CSI report settings.

In Example 2-4, the NZP-CSI-RS resource (CMR) and the ZP-CSI-RS resource (IMR) in the same TRP (resource setting group) do not overlap. The NZP-CSI-RS resource (CMR) in TRP #1 and the ZP-CSI-RS resource (IMR) in TRP #2 do not overlap. In other words, the IMRs corresponding to different TRPs (CSI report settings) do not overlap. In Example 2-4, a CSI report involving inter-TRP interference may be applied.

According to the second embodiment, whether the NZP-CSI-RS resource for channel measurement and the ZP-CSI-RS resource for interference measurement can overlap is clarified, allowing Problem 2 described above to be solved.

Third Embodiment

The UE may assume in interference measurement for a plurality of transmission/reception points (TRPs), the total received power of specific CSI-IM resources (IMRs) for interference measurement corresponds to interference and noise. The interference measurement may be interference measurement for the NCJT. The interference may or may not include inter-TRP interference depending on configurations made by the base station (gNB).

In a case of performing interference measurement based on the ZP-CSI-RS, the UE may measure inter-TRP interference from the PDSCH of the TRP providing interference. However, in actually, traffic is likely to be bursty. Thus, the UE may average the interference in order to improve the accuracy of interference measurement based only on the ZP-CSI-RS.

According to the third embodiment, the assumptions and operations of the UE related to the interference measurement are clarified, allowing Problem 3 described above to be solved.

Fourth Embodiment

The UE performs reception in a plurality of interference measurement resources (IMRs) and a plurality of channel measurement resources (CMRs) configured for a plurality of transmission/reception points, and assumes that the IMRs and CMRs configured for one of the plurality of transmission/reception points are QCLed. The QCL is of, for example, a QCL type D but may be of another QCL type. "IMR and CMR are assumed to be QCLed" may be replaced with a "QCL assumption configured for the IMR is equal to a QCL assumption configured for the CMR," "it is not assumed that resources with different QCL assumptions are configured for the IMR and the CMR," or "IMR and CMR are assumed to be QCLed even in a case where no QCL assumption is configured for at least one of the IMR and CMR." For example, "QCL" may be replaced with "spatial QCL."

The UE may make, for the interference measurement resources (IMR) based on the ZP-CSI-RS, the same QCL assumption (QCL-type D) as the QCL assumption configured for the NZP-CSI-RS resources for channel measurement (CMR).

In a case where one resource setting for channel measurement is associated with a plurality of resource settings for interference measurement, the UE may assume that the CSI-IM resources (IMRs) for each resource setting for interference measurement are QCLed with the NZP-CSI-RS resources for channel measurement (CMR) in units of resources with respect to the QCL type D (this corresponds to Examples 4-1 and 4-3 described below).

Aspect 4-1

In Aspect 4-1, an example will be described in which a joint CSI report is created. The UE may assume that the NZP-CSI-RS resource set for channel measurement (CMR set) and the CSI-IM resource set for interference measurement (IMR set) configured for one CSI resource setting group are QCLed with respect to the "QCL-TypeD." In other words, in Aspect 4-1, the CMR and the IMR may be configured for one resource setting group. "One resource setting group" may be associated with "one TRP."

As an example of Aspect 4-1, Examples 4-1 and 4-2 will be described below. Example 4-1 corresponds to Assumption 1 described above, and Example 4-2 corresponds to Assumption 2 described above.

Example 4-1

Figure 9:
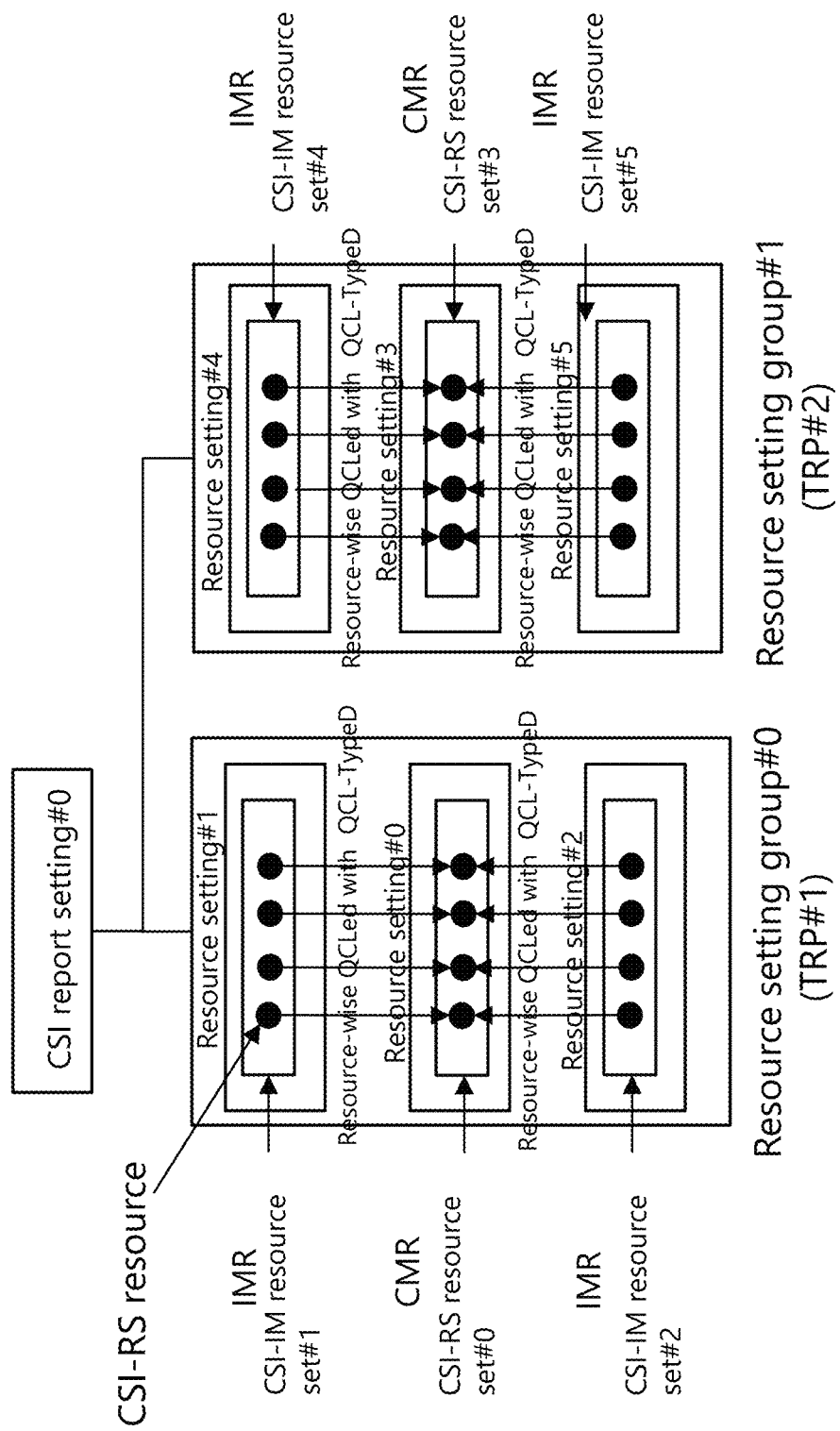
FIG. 9 is a diagram to show a configuration of CSI-RS resources in Example 4-1.

FIG. 9 is a diagram to show a configuration of CSI-RS resources in Example 4-1. In FIG. 9, as is the case with FIG. 1, resource setting group #0 (TRP #1) includes resource settings #0, #1, #2. Resource setting group #1 (TRP #2) includes resource settings #3, #4, #5. The resource settings are CSI reporting setting #0.

The resources in FIG. 9 include a channel measurement resource set (CMR set) and an interference measurement resource set (IMR set). The correspondence between each resource setting and the channel measurement resource set and the interference measurement resource set is similar to the correspondence between each resource setting and the channel measurement resource set and the interference measurement resource set in FIG. 1. The channel measurement resource set and the interference measurement resource set are mapped on a one-by-one basis at each corresponding resource. In each of TRP #1 (resource setting group #0) and TRP #2 (resource setting group #1), a plurality of resources in one channel measurement resource set and a plurality of resources in each of a plurality of interference measurement resource sets for interference measurement are QCLed in units of resources with respect to the "QCL-TypeD."; the resources are configured for one resource setting group (#0 or #1).

Example 4-2

Figure 10:
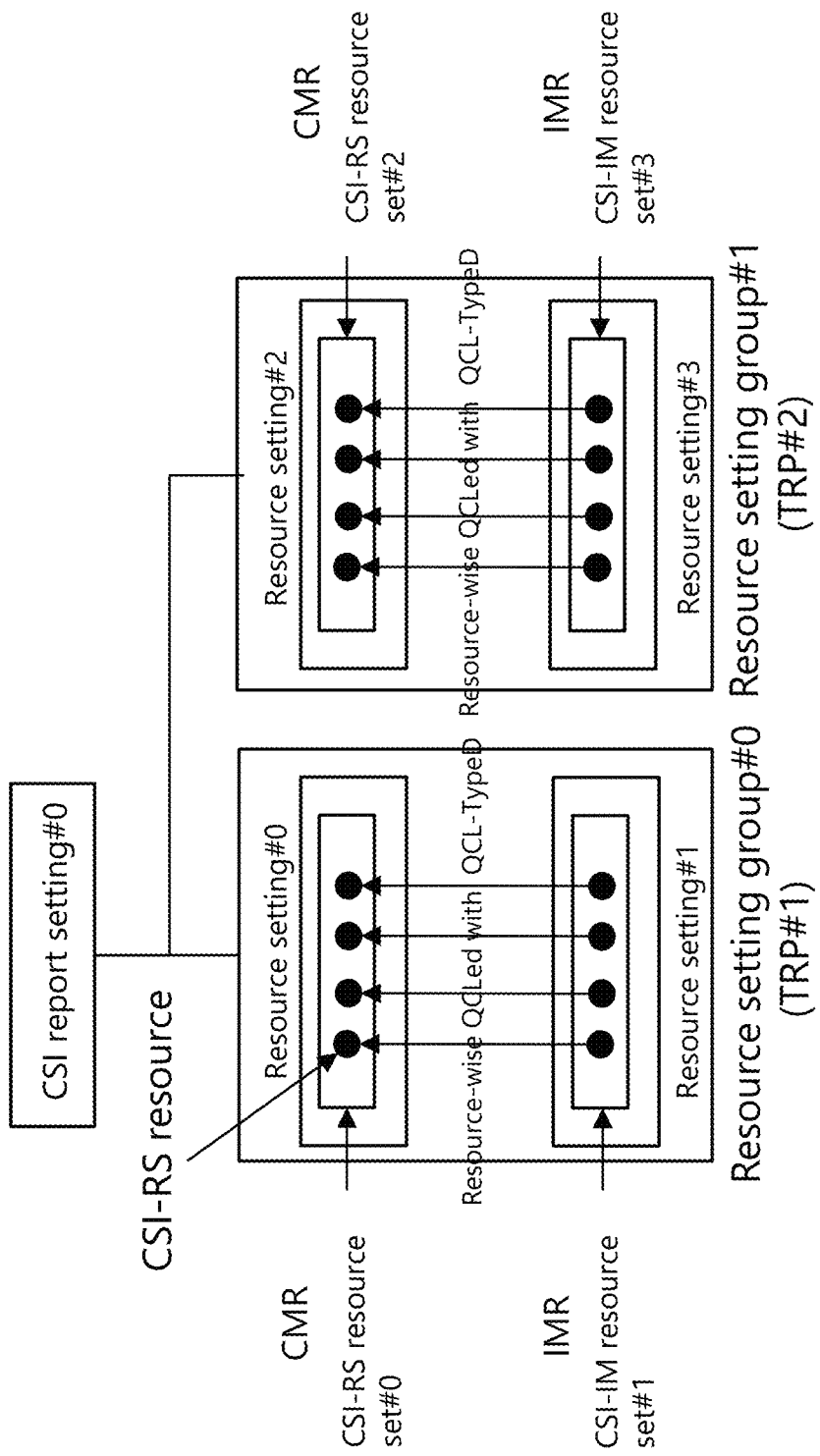
FIG. 10 is a diagram to show a configuration of CSI-RS resources in Example 4-2.

FIG. 10 is a diagram to show a configuration of CSI-RS resources in Example 4-2. FIG. 10 differs from FIG. 9 in that one interference measurement resource set corresponds to one resource setting group (one TRP). As shown in FIG. 10, in each of TRP #1 (resource setting group #0) and TRP #2 (resource setting group #1), a plurality of resources in one channel measurement resource set and a plurality of resources in one interference measurement resource set for interference measurement are QCLed in units of resources with respect to the "QCL-TypeD."; the resources are configured for one resource setting group (#0 or #1).

Aspect 4-2

In Aspect 4-2, an example will be described in which a separate CSI report is created. The UE may assume that the NZP-CSI-RS resource set for channel measurement (CMR set) and the CSI-IM resource set for interference measurement (IMR set) configured for one CSI report (CSI report setting) are QCLed with respect to the "QCL-TypeD." In other words, in Aspect 4-2, the CMR and the IMR may be configured for one CSI report. One CSI report setting may be associated with one TRP. One resource setting group may be associated with one TRP.

As an example of Aspect 4-2, Examples 4-3 and 4-4 will be described below. Example 4-3 corresponds to Assumption 3 described above, and Example 4-4 corresponds to Assumption 4 described above.

Example 4-3

Figure 11:
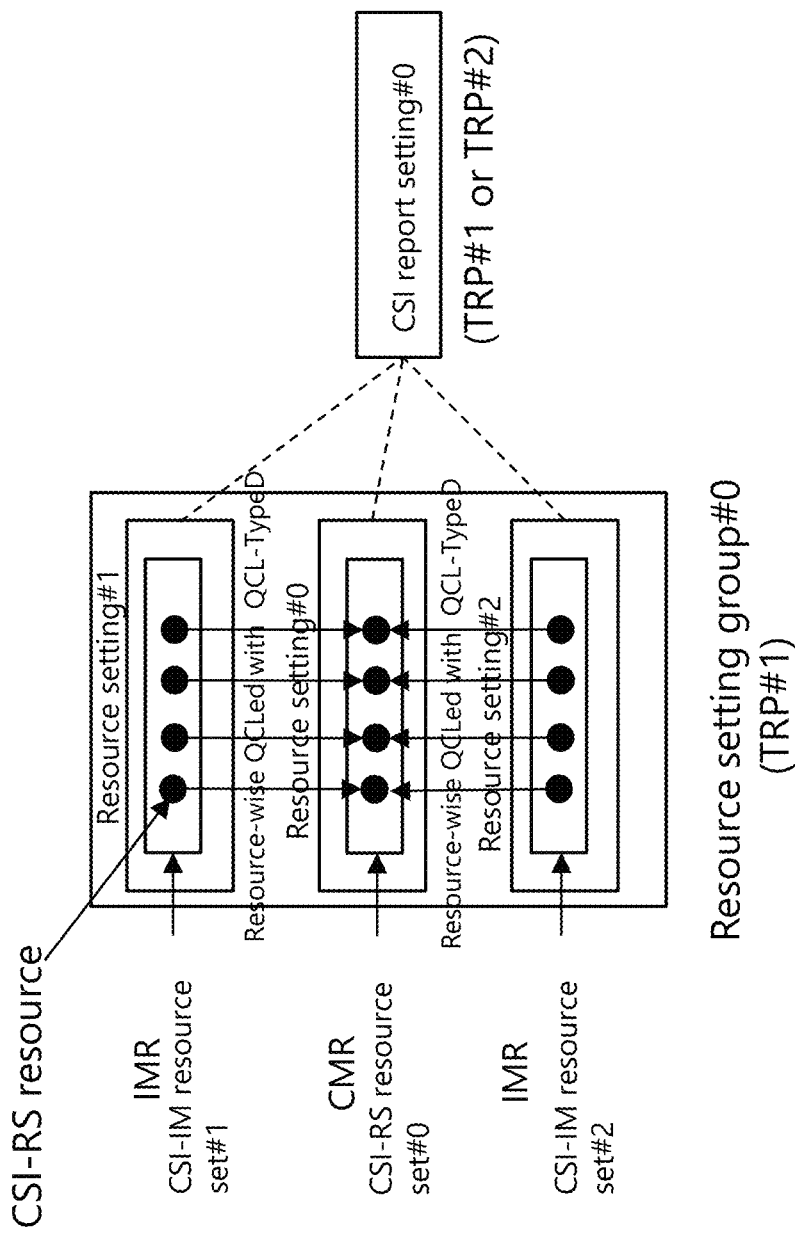
FIG. 11 is a diagram to show a configuration of CSI-RS resources in Example 4-3.

FIG. 11 is a diagram to show a configuration of CSI-RS resources in Example 4-3. FIG. 11 differs from FIG. 9 in that in FIG. 9, a plurality of (two) resource setting groups (TRPs) are associated with one CSI report setting, whereas in FIG. 11, one resource setting group (TRP) is associated with one CSI report setting.

The resources in FIG. 11 include a channel measurement resource set (CMR set) and an interference measurement resource set (IMR set). The correspondence between each resource setting and the channel measurement resource set and the interference measurement resource set is similar to the correspondence between each resource setting and the channel measurement resource set and the interference measurement resource set in FIG. 9. The channel measurement resource set and the interference measurement resource set are mapped on a one-by-one basis at each corresponding resource. In TRP #1 (resource setting group #0), a plurality of resources in one channel measurement resource set and a plurality of resources in each of a plurality of interference measurement resource sets for interference measurement are QCLed in units of resources with respect to the "QCL-TypeD."; the resources are configured for one CSI report (CSI report setting).

Example 4-4

Figure 12:
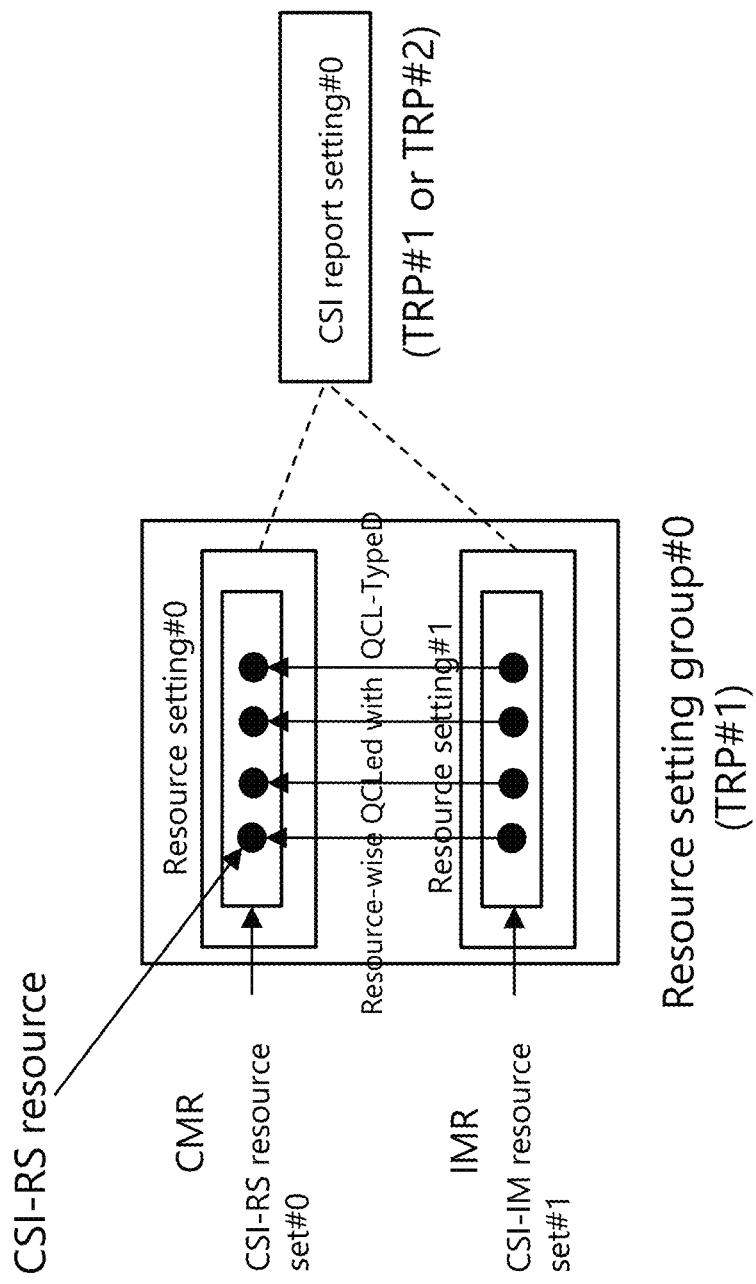
FIG. 12 is a diagram to show a configuration of CSI-RS resources in Example 4-4.

FIG. 12 is a diagram to show a configuration of CSI-RS resources in Example 4-4. FIG. 12 differs from FIG. 11 in that one interference measurement resource set corresponds to one resource setting group (one TRP). As shown in FIG.

12, in TRP #1 (resource setting group #0), a plurality of resources in one channel measurement resource set and a plurality of resources in one interference measurement resource set are QCLed in units of resources with respect to the "QCL-TypeD."; the resources are configured for one CSI report (CSI report setting).

In the fourth embodiment, assuming the QCL relation between the IMR and CMR allows determination of what reception beam for the UE is used for the ZP-CSI-RS resource for interference measurement. Consequently, Problem 4 described above can be solved.

Fifth Embodiment

Based on specifications provided through higher layer signaling, the UE may determine the number of pieces of CSI (for example, RI/PMI/CQI and so on) to be reported corresponding to the CSI report setting and may transmit a CSI report corresponding to the number of pieces of CSI determined. As used herein, "CSI report setting" and "CSI report configuration" may be replaced with each other.

Aspect 5-1

The UE may determine the number of pieces of CSI (for example, RI/PMI/CQI and so on) to be reported corresponding to the CSI report configuration, based on the number of resource settings specified by a parameter (for example, an RRC parameter "csi-IM-ResourcesForInterference") related to interference measurement resources (IMRs) in higher layer signaling. One CSI may be reported for one resource setting for interference measurement.

In a case where a plurality of CMRs are configured in a resource setting for channel measurement and a plurality of IMRs are configured in each resource setting for channel measurement, Proposals 5-1-1 and 5-1-2 described below may be applied to select from the CMRs and IMRs for derivation/calculation of the CSI.

Proposal 5-1-1

The CMRs and IMRs are selected from for CSI derivation according to the implementation of the UE. The UE may report a plurality of pieces of CSI corresponding to the different CMRs. The CMRs may be included in the resource setting group for the joint CSI report, and may be included in the CSI report setting for the separate CSI report.

Figure 13:
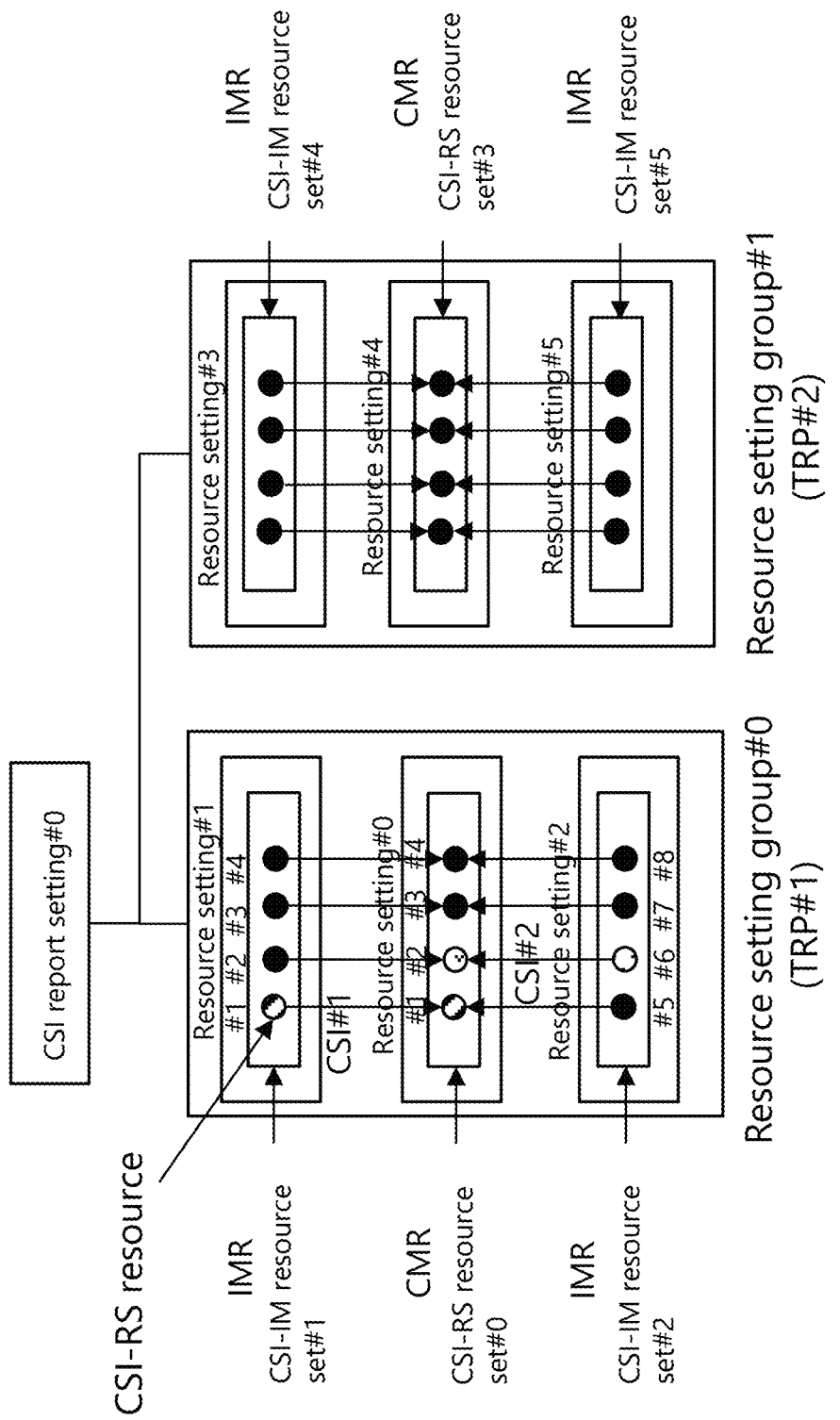
FIG. 13 is a diagram to show a configuration of CSI-RS resources in a case where a joint CSI report is applied to Proposal 5-1-1.

FIG. 13 is a diagram to show a configuration of CSI-RS resources in a case where the joint CSI report is applied to Proposal 5-1-1. FIG. 13 correspond to Assumption 1 described above. The relations between each resource setting group and each resource setting and the CSI report setting are similar to the relations between each resource setting group and each resource setting and the CSI report setting in FIG. 1 and FIG. 9. The relations between the channel measurement resource set (CMR set) and the interference measurement resource set (IMR set) and each resource setting are similar to the relations between the channel measurement resource set and the interference measurement resource set and each resource setting in FIG. 1 and FIG. 9.

For example, the UE reports CSI #1 corresponding to (CMR #1, IMR #1). The UE reports CSI #2 corresponding to (CMR #2, IMR #6). For the joint CSI reports, (CMR #1, IMR #1), (CMR #2, IMR #6) are allocated in resource setting group #0.

Figure 14:
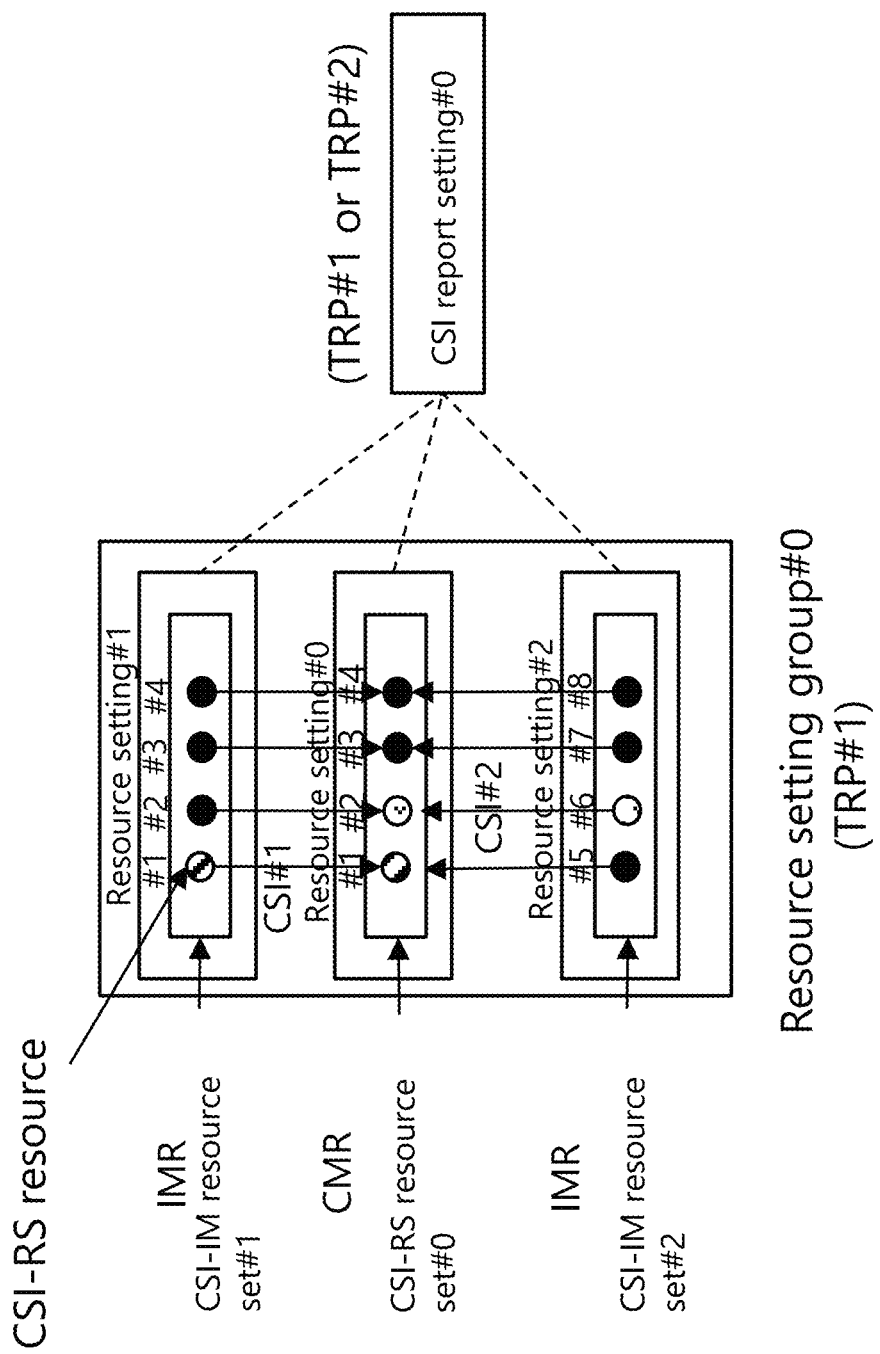
FIG. 14 is a diagram to show a configuration of CSI-RS resources in a case where a separate CSI report is applied to Proposal 5-1-1.

FIG. 14 is a diagram to show a configuration of CSI-RS resources in a case where the separate CSI report is applied to Proposal 5-1-1. FIG. 14 differs from FIG. 13 in that in FIG. 14, one resource setting group (TRP) is associated with one CSI report setting. FIG. 14 correspond to Assumption 3 described above. The UE reports CSI #1 corresponding to (CMR #1, IMR #1). The UE reports CSI #2 corresponding to (CMR #2, IMR #6). For the separate CSI reports (CMR #1, IMR #1), (CMR #2, IMR #6) are allocated in CSI report setting #0.

Proposal 5-1-2

Proposal 5-1-2 is applied to the joint CSI report. The UE need not report a plurality of pieces of CSI corresponding to the different CMRs in the resource setting group (need not expect/assume that the plurality of pieces of CSI are reported).

Option 1

The UE may determine CMRs for CSI calculation/derivation based on L1-SINR.

Option 1-1

The UE may determine CMRs for CSI calculation/derivation based on the best (maximum) L1-SINR in the first resource setting for IM in the resource setting group.

For example, four CMRs are configured in the CM resource setting, and four IMRs are configured for each resource setting for IM, and thus eight IMRs are configured. First, for the four CMRs in the resource setting for CM and the four IMRs in the first resource setting for IM, the UE calculates L1-SINR/CQI from corresponding one CMR and one IMR, and selects the CMR corresponding to the best one of the four L1-SINR/CQIs. Then, in the selected CMR and resource setting, the UE derives the CSI of the IMR associated with the CMR.

Option 1-2

The UE may determine/select CMRs for CSI calculation/derivation based on the best (maximum) L1-SINR in the last resource setting for IM in the resource setting group.

For example, four CMRs are configured in the CM resource setting, and four IMRs are configured for each resource setting for IM, and thus eight IMRs are configured. First, for the four CMRs in the resource setting for CM and the four IMRs in the last resource setting for IM, the UE calculates L1-SINR/CQI from corresponding one CMR and one IMR, and selects the CMR corresponding to the best one of the four L1-SINR/CQIs. Then, in the selected CMR and resource setting, the UE derives the CSI of the IMR associated with the CMR.

Option 1-3

The UE may determine/select CMRs for CSI calculation/derivation based on the best (maximum) L1-SINR in all the resource settings for IM in the resource setting group.

For example, four CMRs are configured in the CM resource setting, and four IMRs are configured for each resource setting for IM, and thus eight IMRs are configured. First, for the four CMRs in the resource setting for CM and the four IMRs in the last resource setting for IM, the UE calculates L1-SINR/CQI from corresponding one CMR and one IMR, and selects the CMR corresponding to the best one of all of the L1-SINR/CQIs calculated. Then, in the selected CMR and resource setting, the UE derives the CSI of the IMR associated with the CMR.

Option 2

The UE may determine/select CMRs for CSI calculation/derivation based on L1-RSRP. The UE may determine/select CMRs for CSI calculation/derivation based on the best (maximum) L1-RSRP in the resource settings for CM in the resource setting group.

For example, four CMRs are configured in the CM resource setting, and four IMRs are configured for each resource setting for IM, and thus eight IMRs are configured. First, the UE calculates L1-RSRP for the four CMRs in the resource setting for CM and selects the CMR corresponding to the best L1-RSRP. Then, in the selected CMR and resource setting, the UE derives the CSI of the IMR associated with the CMR.

Option 3

The UE may determine/select CMRs for CSI calculation/derivation based on a combination of L1-RSRP and L1-SINR.

Option 3-1

The UE determines/selects N CMRs from K CMRs (1<N<=K) based on the N best L1-RSRPs in the resource settings for CM in the resource setting group. Then, the UE determines/selects one CMR from the N CMRs based on the best L1-SINR in the first resource setting/second (or last) resource setting/all the resource settings for IM in the resource setting group.

Option 3-2

The UE determines/selects N CMRs (1<N<=K) from K CMRs based on the best L1-SINR in the first resource setting/second (or last) resource setting/all the resource settings for IM in the resource setting group. Then, the UE determines/selects one CMR from the N CMRs based on the best L1-RSRP in the resource settings for CM in the resource setting group.

Figure 15:
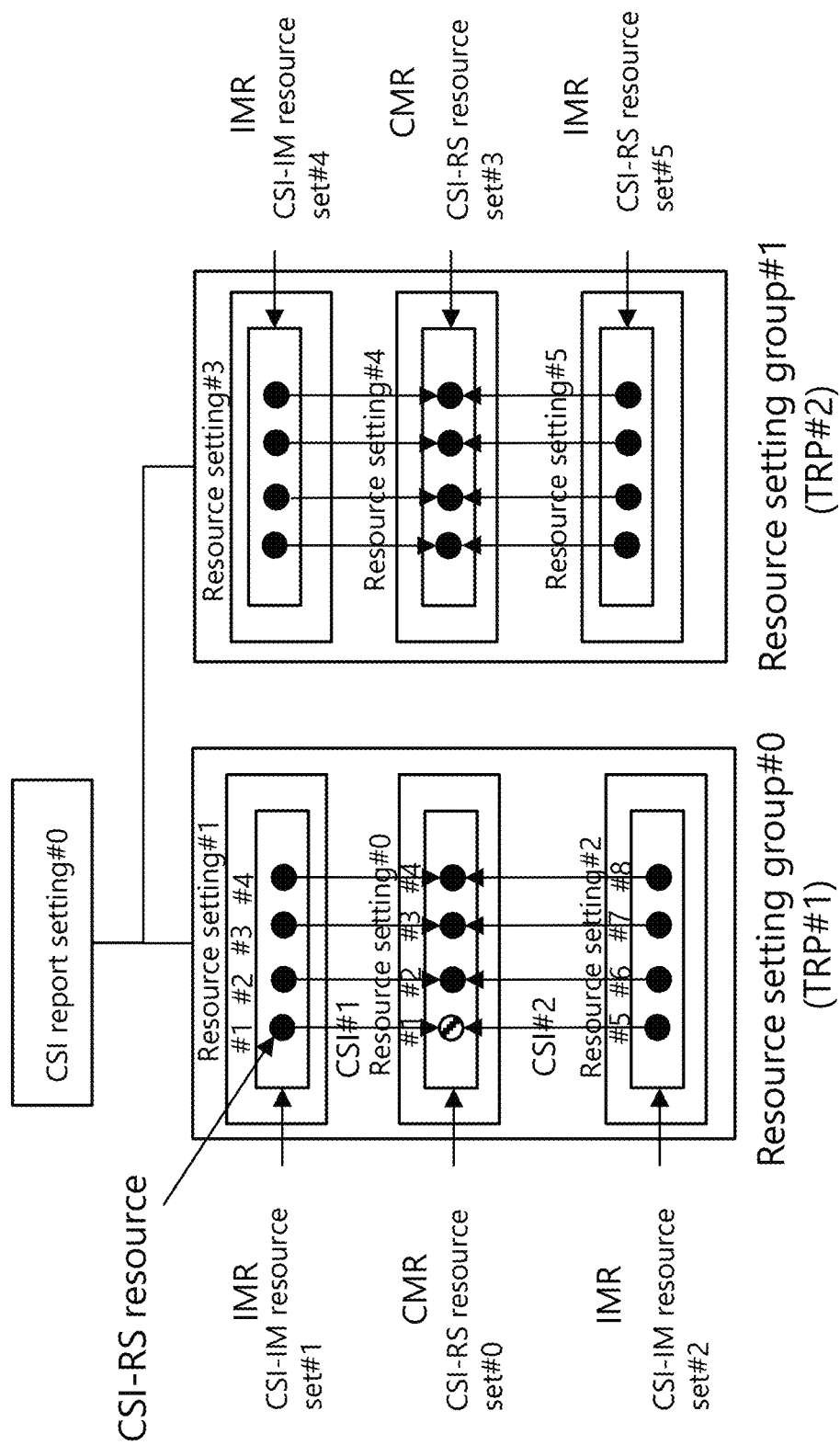
FIG. 15 is a diagram to show a configuration of CSI-RS resources in Proposal 5-1-2.

FIG. 15 is a diagram to show a configuration of CSI-RS resources in Proposal 5-1-2. FIG. 15 correspond to Assumption 1 described above. The relations between each resource setting group and each resource setting and the CSI report setting are similar to the relations between each resource setting group and each resource setting and the CSI report setting in FIG. 1, FIG. 9, and FIG. 13. The relations between the channel measurement resource set (CMR set) and the interference measurement resource set (IMR set) and each resource setting are similar to the relations between the channel measurement resource set and the interference measurement resource set and each resource setting in FIG. 1, FIG. 9, and FIG. 13.

Now, with reference to FIG. 15, examples of Options 1, 2, 3-1, 3-2 will be described.

Example of Option 1

The UE selects CSI-RS resource #1 based on the best L1-SINR in resource setting #1/resource setting #2/resource setting #1 and resource setting #2 (corresponding to Options 1-1/1-2/1-3). Then, the UE calculates/derives the CSI to be reported based on CSI-RS resource #1.

Example of Option 2

The UE selects CSI-RS resource #1 based on the best L1-RSRP in resource setting #0. Then, the UE calculates/derives the CSI to be reported based on CSI-RS resource #1.

Example of Option 3-1

The UE selects CSI-RS resource #1 and CSI-RS resource #2 based on the best L1-RSRP in resource setting #0. The UE selects CSI-RS resource #1 from CSI-RS resource #1 and CSI-RS resource #2 based on the best L1-SINR in resource setting #1/resource setting #2/resource setting #1 and resource setting #2 (the first resource setting/second (or last) resource setting/all the resource settings for IM in the resource setting group). Then, the UE calculates/derives the CSI to be reported based on CSI-RS resource #1.

Example of Option 3-2

The UE selects CSI-RS resource #1 and CSI-RS resource #2 based on the optimal L1-SINR in resource setting #1/resource setting #2/resource setting #1 and resource setting #2 (the first resource setting/second (or last) resource setting/all the resource settings for IM in the resource setting group). Then, the UE selects CSI-RS resource #1 from CSI-RS resource #1 and CSI-RS resource #2 based on the optimal L1-RSRP in resource setting #0. The UE calculates/derives the CSI to be reported based on CSI-RS resource #1.

Proposal 5-1-3

Proposal 5-1-3 is applied to the joint CSI report. The UE need not report a plurality of pieces of CSI corresponding to the different CMRs in the CSI report setting (need not expect/assume that the plurality of pieces of CSI are reported).

Note that as an option of Proposal 5-1-3, contents with the "resource setting group" in each option of Proposal 5-1-2 replaced with the "CSI report setting" are applied.

Figure 16:
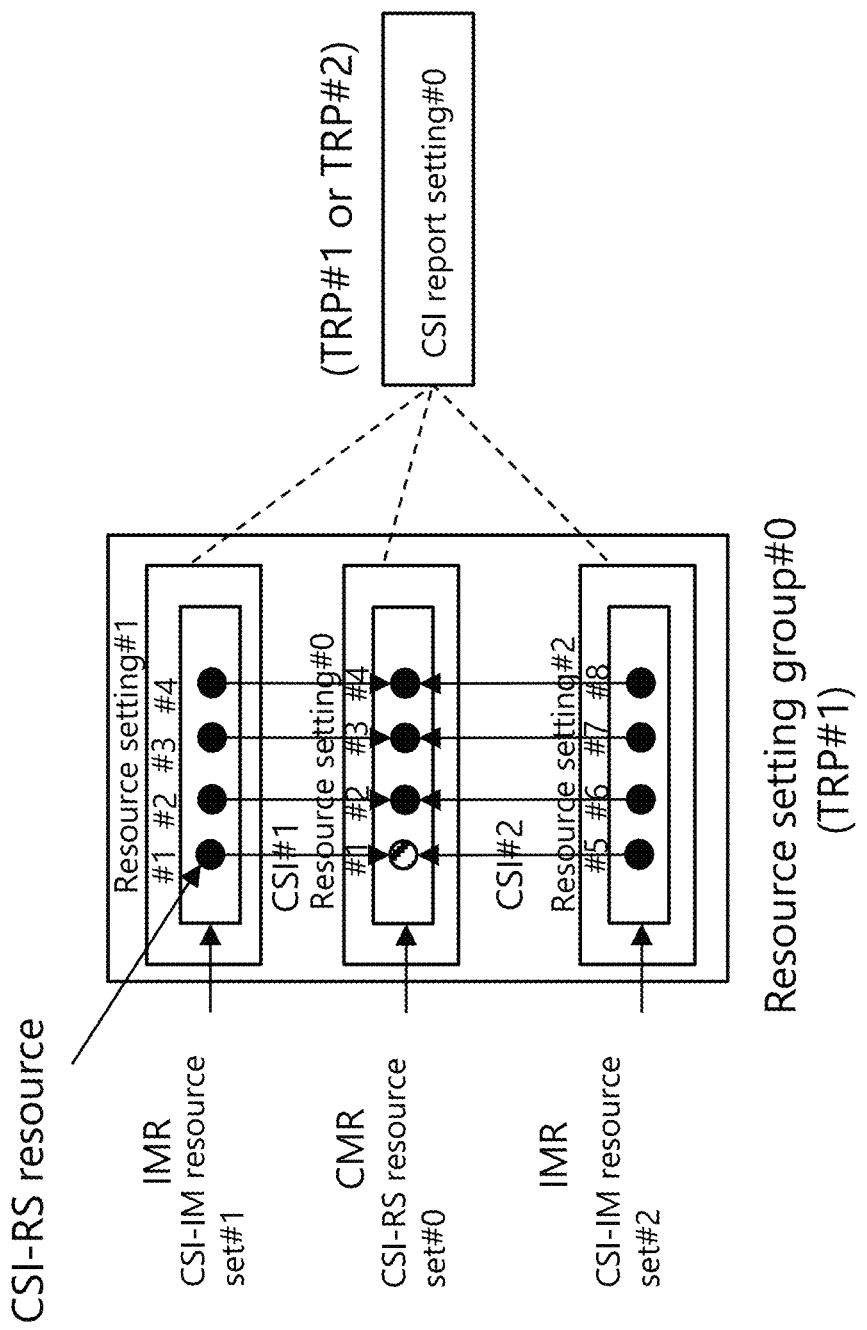
FIG. 16 is a diagram to show a configuration of CSI-RS resources in Proposal 5-1-3.

FIG. 16 is a diagram to show a configuration of CSI-RS resources in Proposal 5-1-3. FIG. 16 differs from FIG. 15 in that in FIG. 14, one resource setting group (TRP) is associated with one CSI report setting. FIG. 16 correspond to Assumption 3 described above. The example of Option 1, the example of Option 2, the example of Option 3-1, and the example of Option 3-2 in Proposal 5-1-2 also correspond to FIG. 16 and can be applied as examples of Proposal 5-1-3.

Aspect 5-2

Based on specifications provided through higher layer signaling (explicit RRC configuration indicating the number of pieces of CSI to be reported), the UE may determine the number of pieces of CSI (for example, RI/PMI/CQI and so on) to be reported corresponding to the CSI report setting. In Aspect 5-2, the UE may apply Proposals 5-1-1, 5-1-2, and 5-1-3 related to a method for selecting from CMRs and IMRs.

In a case where the configured number of pieces of CSI to be reported is less than the number of pieces of CSI implicitly derived (for example, the number of pieces of CSI determined by using Aspect 5-1), the UE may further select CSI from the selected pieces of CSI (may narrow the selection range) based on the following option 1 or 2.

Option 1

The UE selects the pieces of CSI associated with CMRs in the first/last resource setting for IM (resource setting with the lowest/highest ID).

Option 2

The UE selects the CSI associated with the lowest/highest L1-SINR.

FIG. 17 is a diagram to show an example of a configuration of RRC configuration in Aspect 5-2. "nrofReportedRS-r17" indicates the number of CSI to be reported. The UE may determine the number of pieces of CSI to be reported corresponding to the CSI report configuration, based on the value of "nrofReportedRS-r17" shown in FIG. 17.

Modified Examples

The UE may determine the number of pieces of CSI (RI/PMI/CQI and so on) to be reported corresponding to the CSI report configuration, based on the number of resource settings specified by a parameter (for example, an RRC parameter "resourcesForChannelMeasurement") related to channel measurement resources (CMRs) in higher layer signaling.

Within the resource setting group (for the joint CSI report) or within the CSI report configuration (for the separate CSI report), the configurations below may be applied in order to report a plurality of pieces of CSI.

For the joint CSI report, a plurality of resource settings for channel measurement are configured in each resource setting group, and a plurality of resource settings for interference measurement are configured in each resource setting group. The number of resource settings for channel measurement is the same as the number of resource settings for interference measurement in the resource setting group. The CMRs in each of the resource settings for channel measurement in the same resource setting group are the same.

Figure 18:
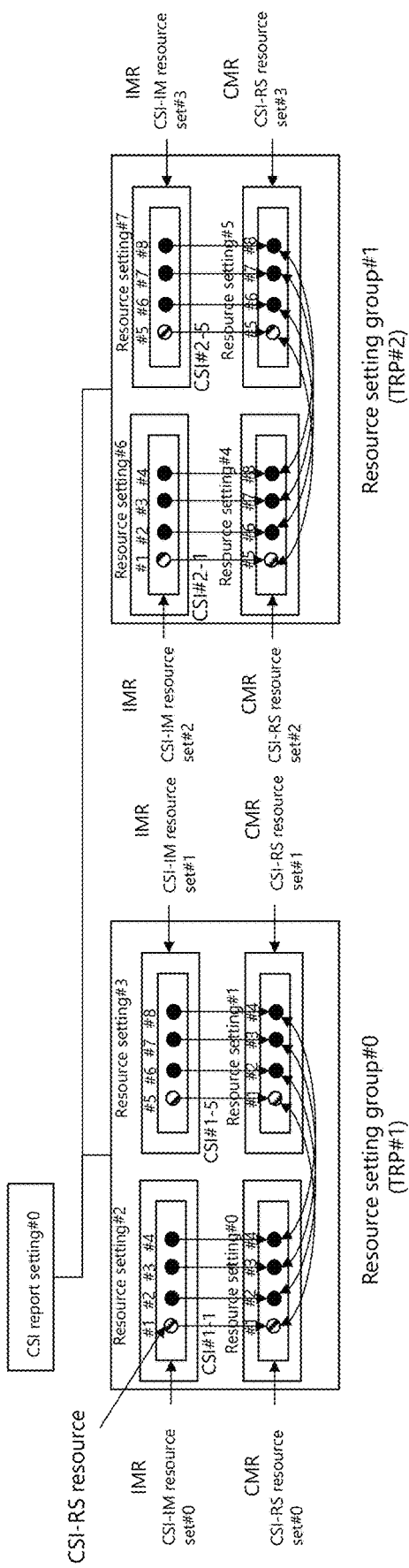
FIG. 18 is a diagram to show a configuration of CSI-RS resources in a case of a joint CSI report in a modified example.

FIG. 18 is a diagram to show a configuration of CSI-RS resources in a case of the joint CSI report in a modified example. In FIG. 18, in each resource setting group, the number of resource settings for channel measurement is 2 (#0, #1), and the number of resource settings for interference measurement is also 2 (#2, #3); the numbers are the same. The CMRs in each of the resource settings (#0, #1) for channel measurement in the same resource setting group are the same.

For the separate CSI report, a plurality of resource settings for channel measurement are configured by each CSI report setting, and a plurality of resource settings for interference measurement are configured by each CSI report setting. The number of resource settings for channel measurement is the same as the number of resource settings for interference measurement in the same CSI report setting. The CMRs in each of the resource settings for channel measurement in the same CSI report setting.

Figure 19:
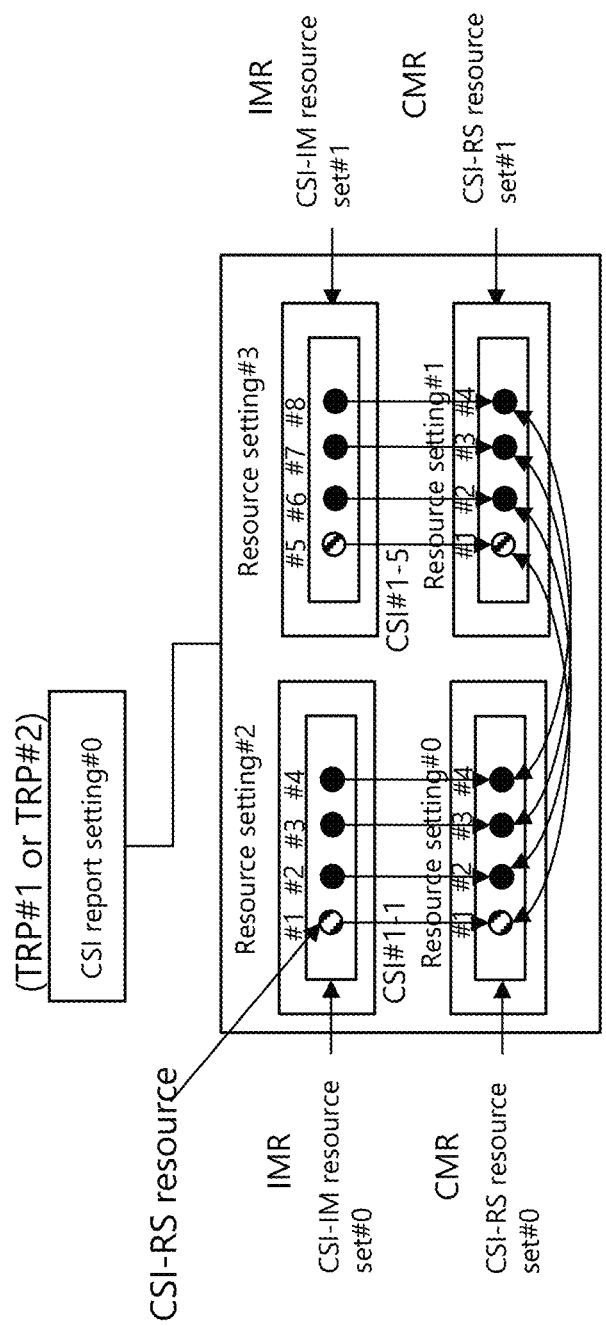
FIG. 19 is a diagram to show a configuration of CSI-RS resources in a case of a separate CSI report in a modified example.

FIG. 19 is a diagram to show a configuration of CSI-RS resources in a case of the separate CSI report in a modified example. In FIG. 19, the number of resource settings for channel measurement is 2 (#0, #1), and the number of resource settings for interference measurement in the same CSI report setting is also 2 (#2, #3); the numbers are the same. The CMRs in each of the resource settings (#0, #1) for channel measurement in the same CSI report setting.

Note that Proposals 5-1-1, 5-1-2, and 5-1-3 related to the method for selecting from CMRs and IMRs may be applied in combination with the method in the present modified example.

According to the fifth embodiment, the method for determining the number of pieces of CSI to be reported or the method for selecting from CMRs/IMRs for a CSI report is clarified, allowing Problem 5 to be solved.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 20:
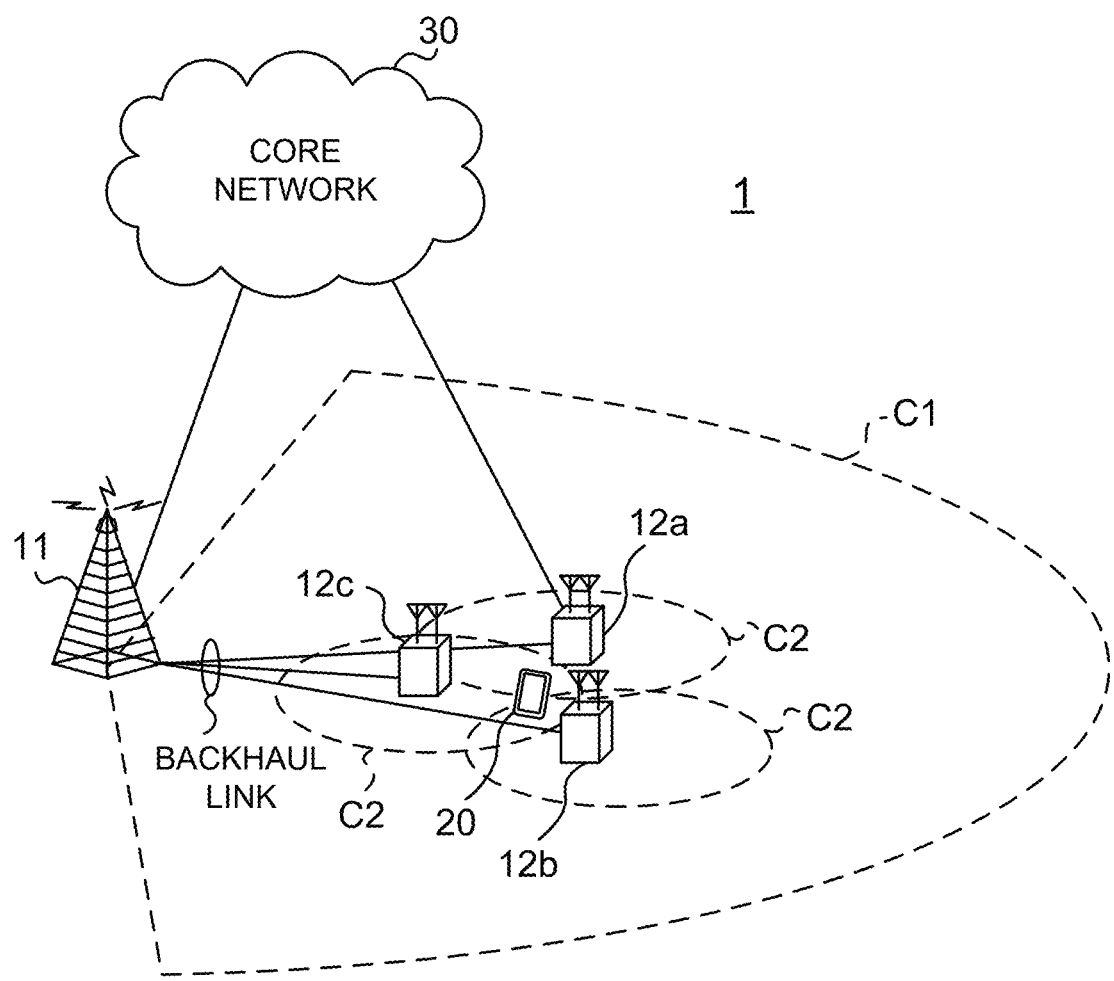
FIG. 20 is a diagram to show an example of a schematic structure of a radio communication system according to one embodiment.

FIG. 20 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell Cl of a relatively wide coverage, and base stations 12 (12a to 12c) that form small cells C2, which are placed within the macro cell Cl and which are narrower than the macro cell Cl. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell Cl may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 21:
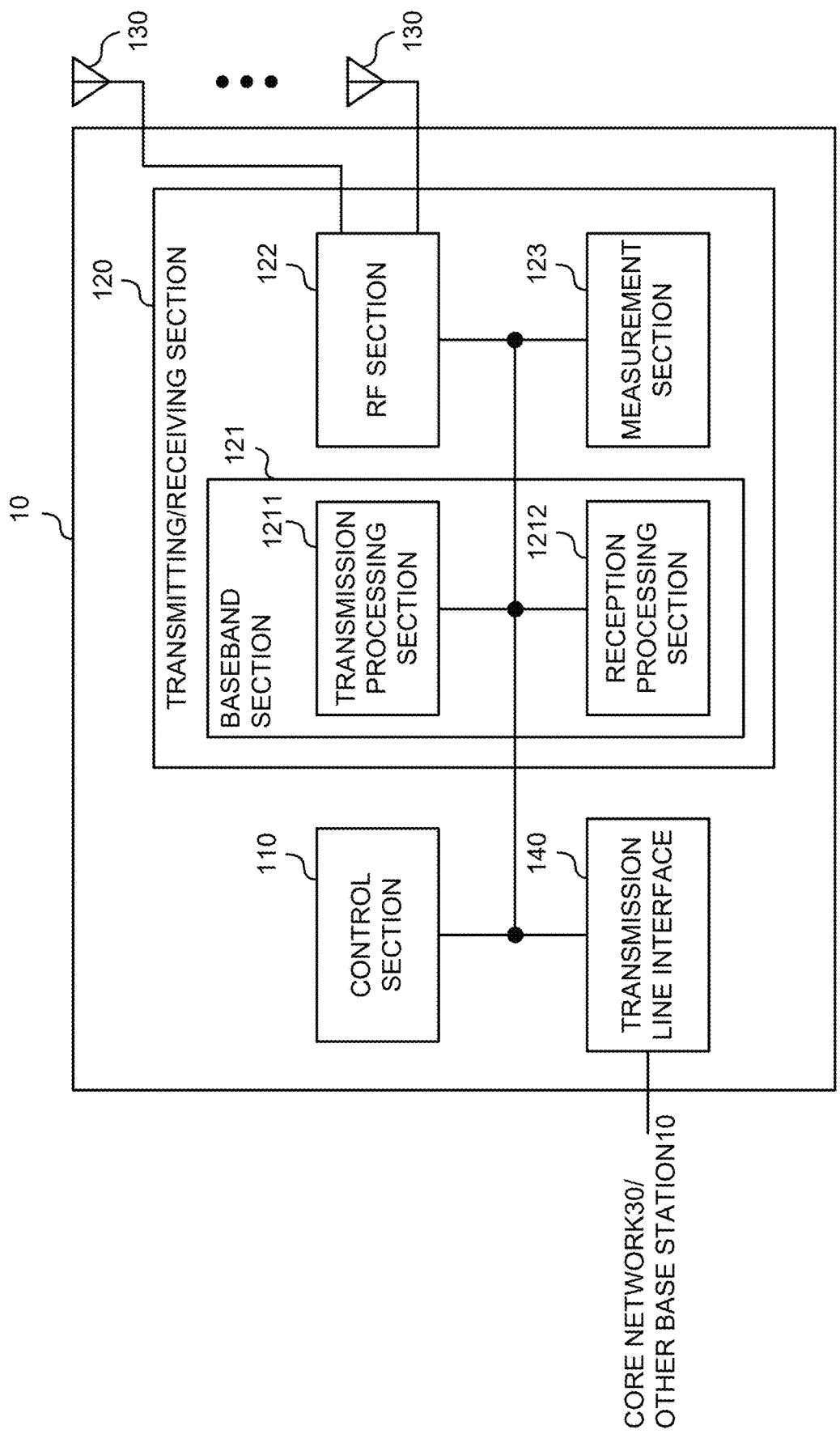
FIG. 21 is a diagram to show an example of a structure of a base station according to one embodiment.

FIG. 21 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to a plurality of transmission/reception points, a configuration of at least one of a zero power channel state information reference signal (ZP-CSI-RS) resource and a non-zero power channel state information reference signal (NZP-CSI-RS) resource. The transmitting/receiving section 120 may receive at least one of the periodic CSI report, the semi-persistent CSI report, and the aperiodic CSI report that include the results of interference measurement based on the configuration described above.

The transmitting/receiving section 120 may transmit, to a plurality of transmission/reception points, configuration of a plurality of interference measurement resources (IMRs) and a plurality of channel measurement resources (CMRs). The control section 110 may control the IMR and CMR that are configured for one of the plurality of transmission/reception points and that are QCLed.

The transmitting/receiving section 120 may transmit, through higher layer signaling, a specification used to determine the number of pieces of CSI to be reported corresponding to the channel state information (CSI) reporting setting. The transmitting/receiving section 120 may receive CSI report corresponding to the number of the pieces of CSI determined.

(User Terminal)

Figure 22:
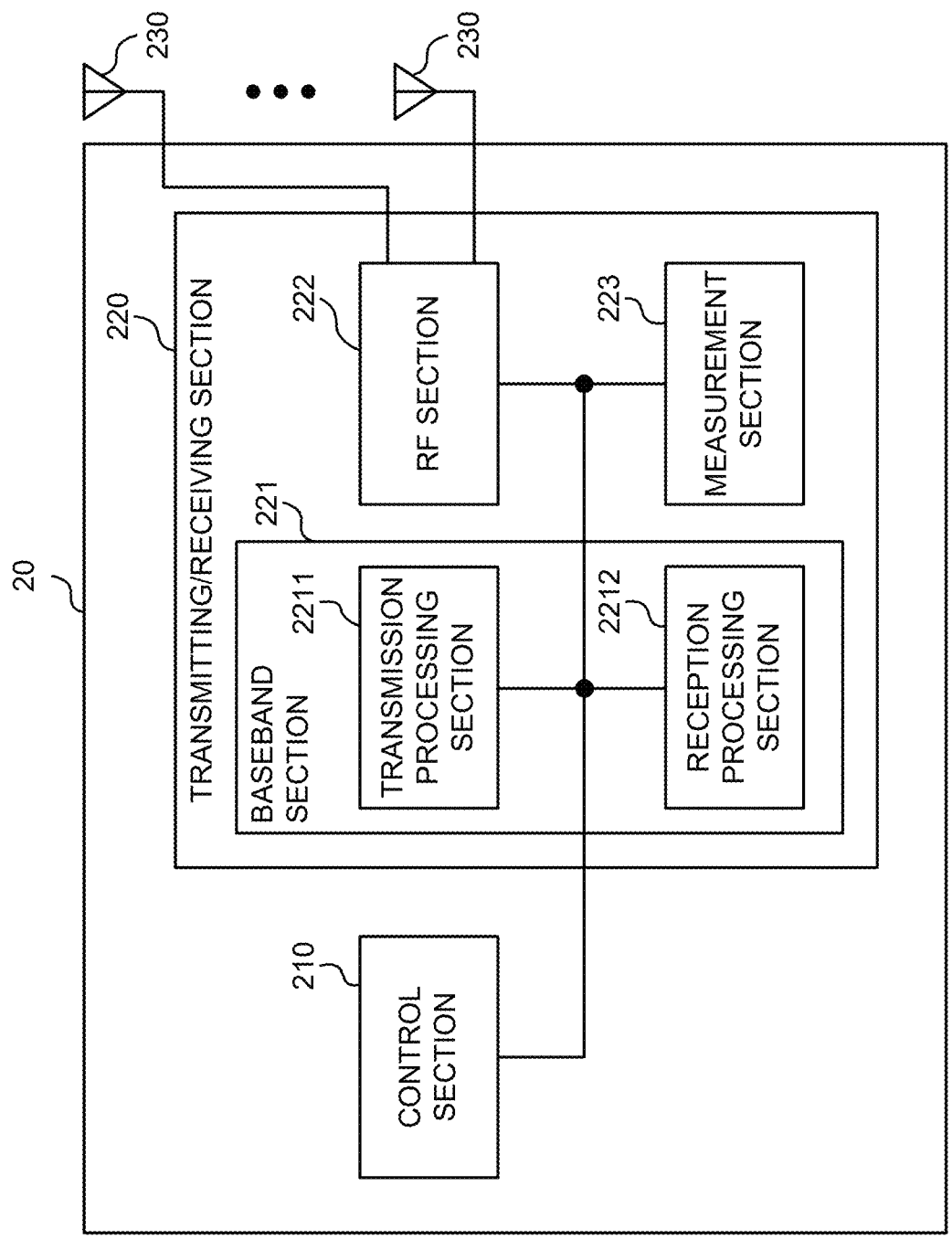
FIG. 22 is a diagram to show an example of a structure of a user terminal according to one embodiment.

FIG. 22 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may perform reception in at least one of the zero power channel state information reference signal (ZP-CSI-RS) resource and the non-zero power channel state information reference signal (NZP-CSI-RS) resource that are configured for the plurality of transmission/reception points. The control section 210 may control interference measurement for at least one of the periodic CSI report, the semi-persistent CSI report, and the aperiodic CSI report that include the results of interference measurement based on the reception described above.

The interference measurement may be based exclusively on the ZP-CSI-RS. The NZP-CSI-RS resource for channel measurement for one of the plurality of transmission/reception points and the ZP-CSI-RS resource for interference measurement for another transmission/reception point of the plurality of TRPs may be configured not to overlap.

The transmitting/receiving section 220 may perform reception in a plurality of interference measurement resources (IMRs) and a plurality of channel measurement resources (CMRs) that are configured for the plurality of transmission/reception points. The control section 210 may assume that the IMR and CMR configured for one of the plurality of transmission/reception points are QCLed.

The CMR and the IMR may be configured for one resource setting group. The CMR and the IMR may be configured for one CSI report. In interference measurement for the plurality of transmission/reception points, the total received power of the IMRs may correspond to interference and noise.

The control section 210 may determine, based on a specification provided through higher layer signaling, the number of pieces of channel state information (CSI) to be reported corresponding to the CSI report setting. The transmitting/receiving section 220 may transmit a CSI report corresponding to the number of the pieces of CSI determined. The specification provided through higher layer signaling may indicate the number of the pieces of CSI.

The control section 210 may determine the number of pieces of CSI based on the number of resource settings specified by a parameter related to interference measurement resources in the higher layer signaling. The control section 210 may determine the number of pieces of CSI based on the number of resource settings specified by a parameter related to channel measurement resources in the higher layer signaling.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 23:
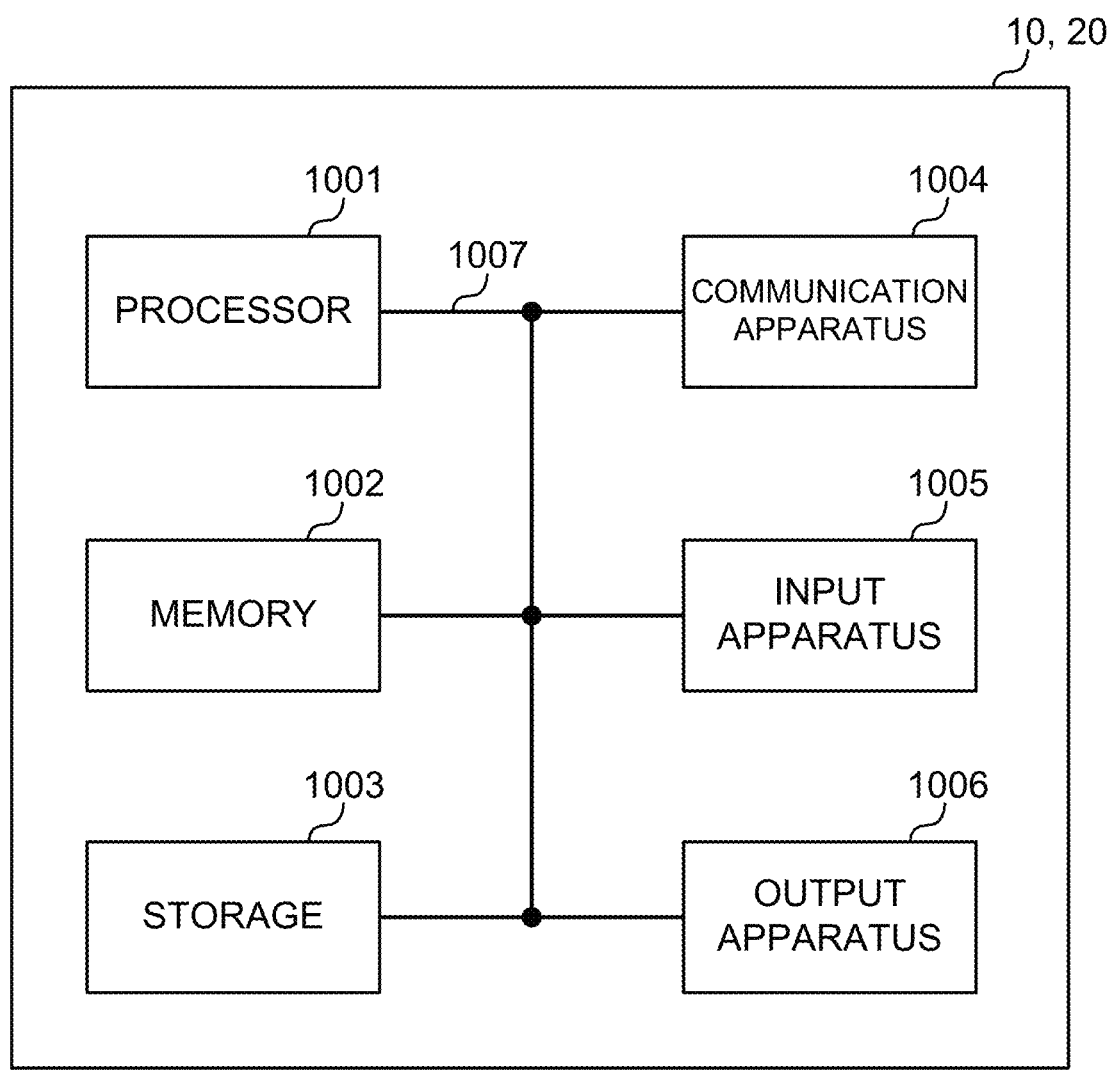
FIG. 23 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 23 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device,"

a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004.

In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives information regarding non-zero power channel state information reference signal (NZP-CSI-RS) resources or CSI-interference measurement (IM) resources; and
   a processor that controls interference measurement based on the CSI-IM resources corresponding to two resource groups, and does not control interference measurement based on the NZP-CSI-RS resources corresponding to the two resource groups,
   wherein a number of CSI-RS resources for channel measurement is the same as a number of the CSI-IM resources, and
   the CSI-IM resources and the NZP-CSI-RS resources for channel measurement are quasi co-located (QCL) with respect to QCL type D.

2. The terminal according to claim 1, wherein a channel measurement resource for a first resource group and a channel measurement resource for a second resource group are associated with a single CSI report setting.

3. A radio communication method for a terminal, comprising:
   receiving information regarding non-zero power channel state information reference signal (NZP-CSI-RS) resources or CSI-interference measurement (IM) resources; and
   controlling interference measurement based on the CSI-IM resources corresponding to two resource groups, and not controlling interference measurement based on the NZP-CSI-RS resources corresponding to the two resource groups,
   wherein a number of CSI-RS resources for channel measurement is the same as a number of the CSI-IM resources, and
   the CSI-IM resources and the NZP-CSI-RS resources for channel measurement are quasi co-located (QCL) with respect to QCL type D.

4. A base station comprising:
   a transmitter that transmits information regarding non-zero power channel state information reference signal (NZP-CSI-RS) resources or CSI-interference measurement (IM) resources; and
   a processor that controls reception of a CSI report, the CSI report including a result of interference measurement based on the CSI-IM resources corresponding to two resource groups and not including a result of interference measurement based on the NZP-CSI-RS resources corresponding to the two resource groups,
   wherein a number of CSI-RS resources for channel measurement is the same as a number of the CSI-IM resources, and
   the CSI-IM resources and the NZP-CSI-RS resources for channel measurement are quasi co-located (QCL) with respect to QCL type D.

5. A system comprising a terminal and a base station, wherein
   the base station comprises:
   a transmitter that transmits information regarding non-zero power channel state information reference signal (NZP-CSI-RS) resources or CSI-interference measurement (IM) resources, and
   the terminal comprises:
   a receiver that receives the information regarding the NZP-CSI-RS resources or the CSI-IM resources; and
   a processor that controls interference measurement based on the CSI-IM resources corresponding to two resource groups, and does not control interference measurement based on the NZP-CSI-RS resources corresponding to the two resource groups,
   wherein a number of CSI-RS resources for channel measurement is the same as a number of the CSI-IM resources, and the CSI-IM resources and the NZP-CSI-RS resources for channel measurement are quasi co-located (QCL) with respect to QCL type D.

\* \* \* \* \*